US009167200B2

(12) United States Patent
Odanaka et al.

(10) Patent No.: US 9,167,200 B2
(45) Date of Patent: *Oct. 20, 2015

(54) COMMUNICATION APPARATUS

(71) Applicant: RICOH COMPANY, LTD., Tokyo (JP)

(72) Inventors: Satoshi Odanaka, Kanagawa (JP); Tsutomu Osawa, Kanagawa (JP)

(73) Assignee: RICOH COMPANY, LTD., Tokyo (JP)

(*) Notice: Subject to any disclaimer, the term of this patent is extended or adjusted under 35 U.S.C. 154(b) by 47 days.

This patent is subject to a terminal disclaimer.

(21) Appl. No.: 14/021,500

(22) Filed: Sep. 9, 2013

(65) Prior Publication Data

US 2014/0009566 A1    Jan. 9, 2014

Related U.S. Application Data

(63) Continuation of application No. 13/337,727, filed on Dec. 27, 2011, now Pat. No. 8,570,434.

(30) Foreign Application Priority Data

Jan. 14, 2011    (JP) .................................. 2011-006370

(51) Int. Cl.
*H04N 7/14* (2006.01)
*H04N 5/225* (2006.01)
*H04N 7/18* (2006.01)

(52) U.S. Cl.
CPC ............. *H04N 7/142* (2013.01); *H04N 5/2252* (2013.01); *H04N 7/147* (2013.01); *H04N 7/18* (2013.01)

(58) Field of Classification Search
CPC ....... H04N 7/142; H04N 5/2252; H04N 7/18; H04N 7/147
USPC .................. 348/61–141, 240.13; 396/86, 133
See application file for complete search history.

(56) References Cited

U.S. PATENT DOCUMENTS

| 4,888,795 A | 12/1989 | Ando et al. |
| 5,280,540 A | 1/1994 | Addeo et al. |

(Continued)

FOREIGN PATENT DOCUMENTS

| EP | 0 836 324 A2 | 4/1998 |
| JP | 06-125552 A | 5/1994 |

(Continued)

OTHER PUBLICATIONS

Office Action issued Oct. 27, 2014 in Japanese Patent Application No. 2011-006370.

(Continued)

*Primary Examiner* — Twyler Haskins
*Assistant Examiner* — Peter Chon
(74) *Attorney, Agent, or Firm* — Oblon, McClelland, Maier & Neustadt, L.L.P.

(57) ABSTRACT

Disclosed is a communication apparatus including an image input unit that includes an image input member that inputs an image of an object and a retaining member that retains the image input member at its one edge; an enclosure to which a concave portion is formed at its one side surface; a uniaxial hinge device that includes a first hinge member and a second hinge member rotatably connected with each other and capable of rotating around a first axial line with respect to each other, the first hinge member being connected to the enclosure and the second hinge member being connected to the other edge of the retaining member. The image input unit is rotated via the uniaxial hinge device around the first axial line with respect to the enclosure between a housing position and a protruding position.

19 Claims, 29 Drawing Sheets

(56) References Cited

U.S. PATENT DOCUMENTS

| | | | |
|---|---|---|---|
| 6,411,332 B1* | 6/2002 | Whitby et al. | 348/376 |
| 6,904,298 B2 | 6/2005 | Arai et al. | |
| 7,336,775 B2 | 2/2008 | Tanaka et al. | |
| 7,578,630 B2 | 8/2009 | Watanabe et al. | |
| 7,660,114 B2 | 2/2010 | Watanabe et al. | |
| 7,671,291 B2 | 3/2010 | Odanaka | |
| 7,710,497 B2* | 5/2010 | Sukenari et al. | 348/375 |
| 7,929,050 B2* | 4/2011 | Liang et al. | 348/373 |
| 7,961,471 B2 | 6/2011 | Odanaka et al. | |
| 8,570,434 B2* | 10/2013 | Odanaka et al. | 348/373 |
| 2004/0267990 A1 | 12/2004 | Lin | |
| 2007/0107163 A1* | 5/2007 | Barnett | 16/367 |
| 2010/0186549 A1 | 7/2010 | Ross | |
| 2010/0188549 A1* | 7/2010 | Ichieda | 348/333.01 |
| 2010/0289906 A1* | 11/2010 | Kaye et al. | 348/207.11 |

FOREIGN PATENT DOCUMENTS

| | | |
|---|---|---|
| JP | 06-292195 A | 10/1994 |
| JP | 9-205629 | 8/1997 |
| JP | 10-285569 | 10/1998 |
| JP | 2002-262250 | 9/2002 |

OTHER PUBLICATIONS

Office Action mailed Feb. 14, 2014 in co-pending U.S. Appl. No. 13/222,312.

Office Action mailed Aug. 21, 2013 in co-pending U.S. Appl. No. 13/222,312.

Office Action mailed Feb. 12, 2013 in co-pending U.S. Appl. No. 14/113,712.

Office Action mailed Feb. 26, 2014 in co-pending U.S. Appl. No. 13/448,672.

* cited by examiner

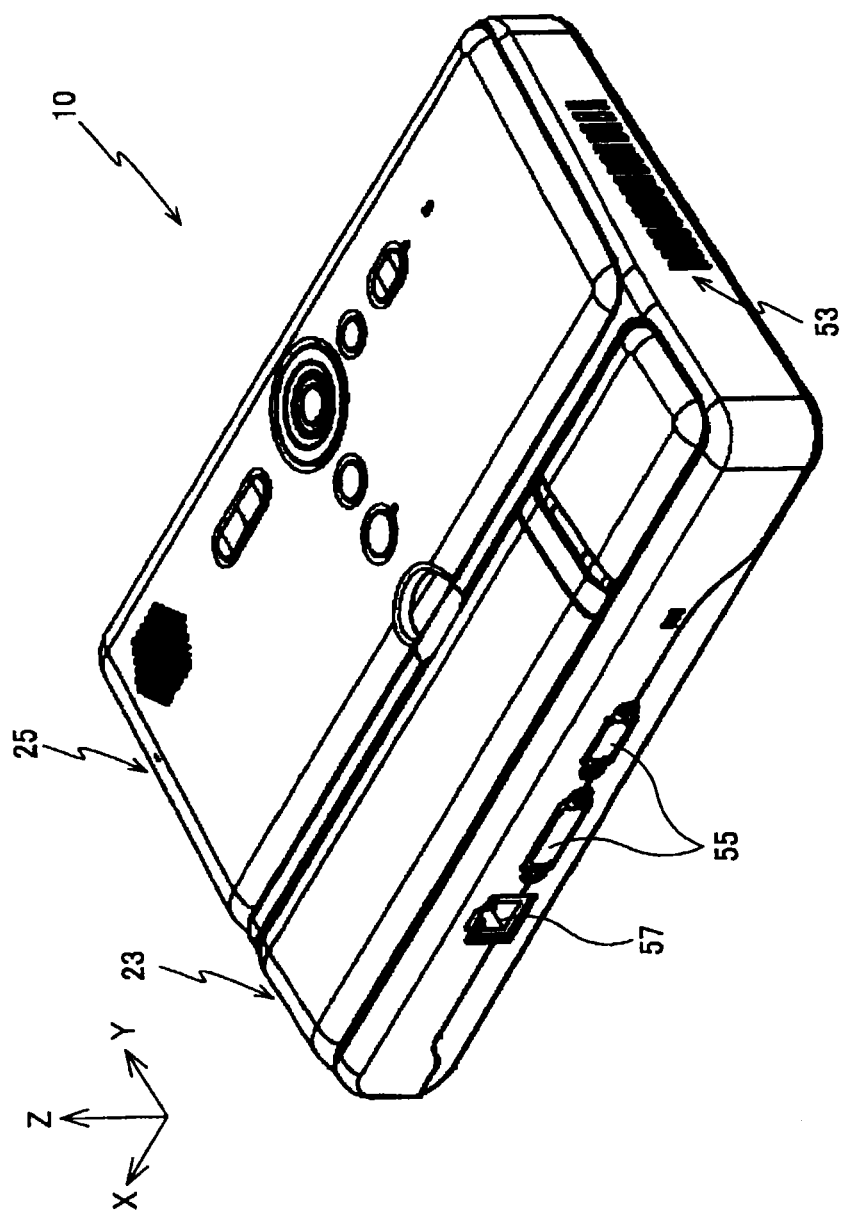

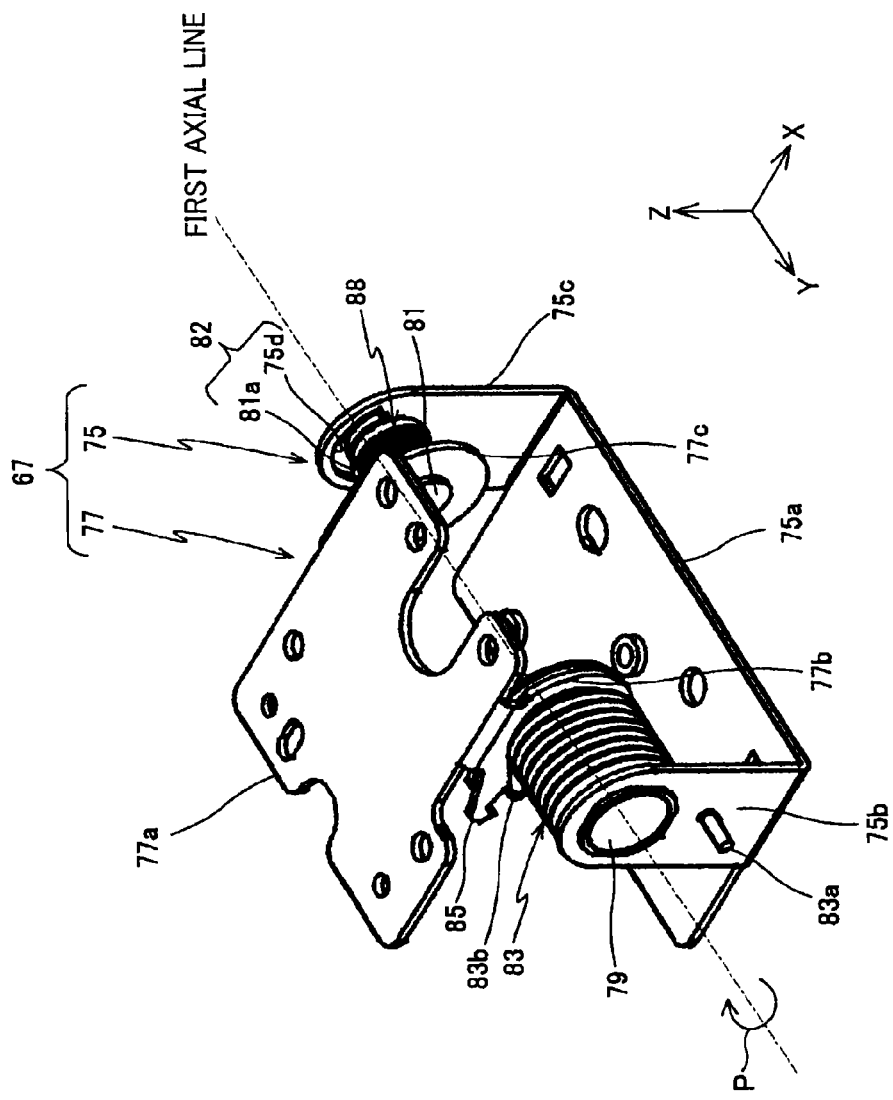

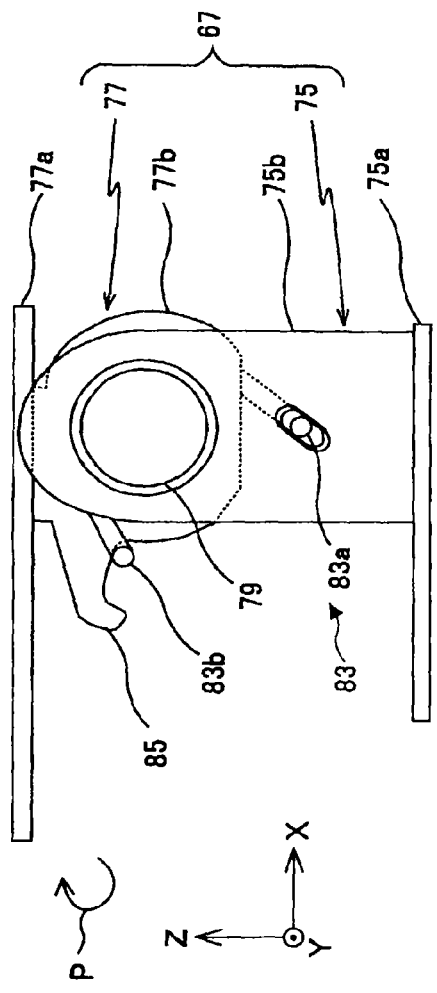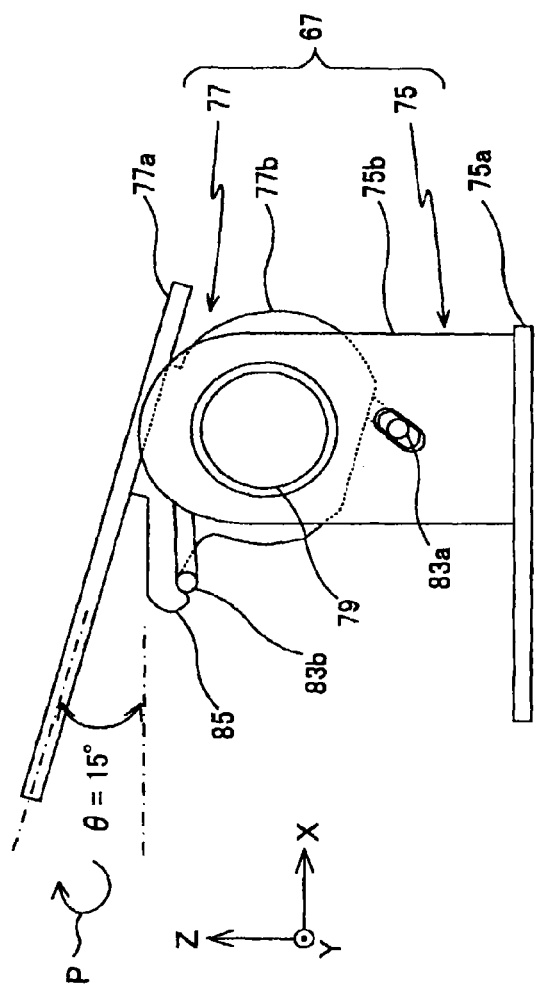
FIG.10A
FIG.10B

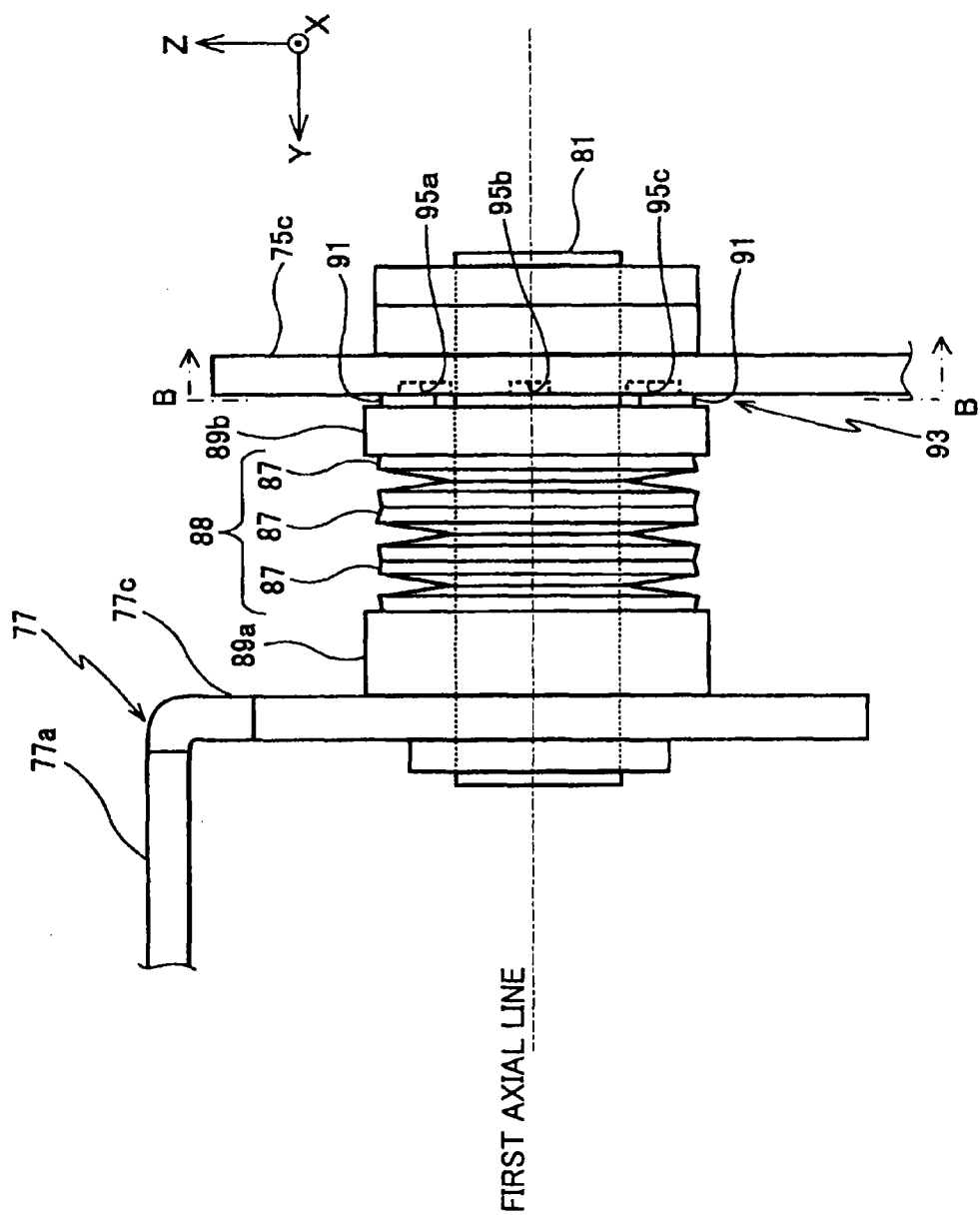

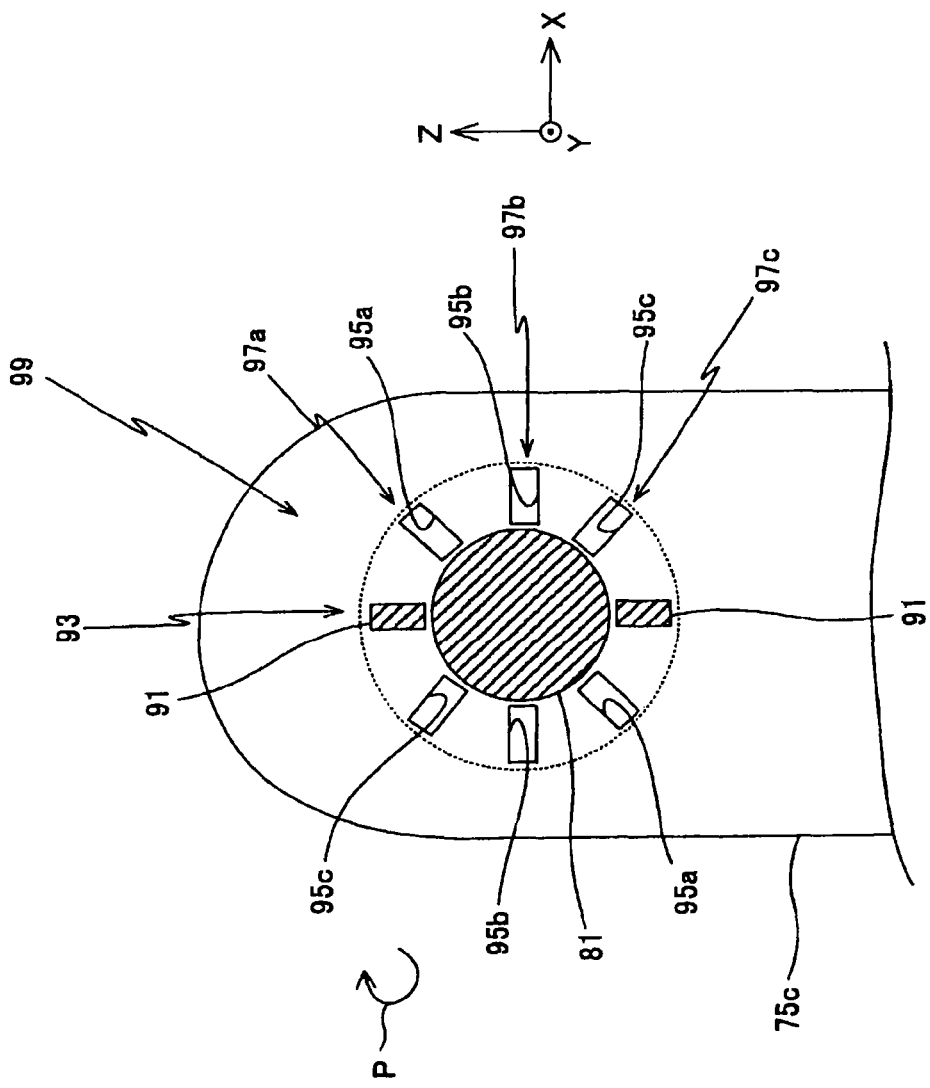

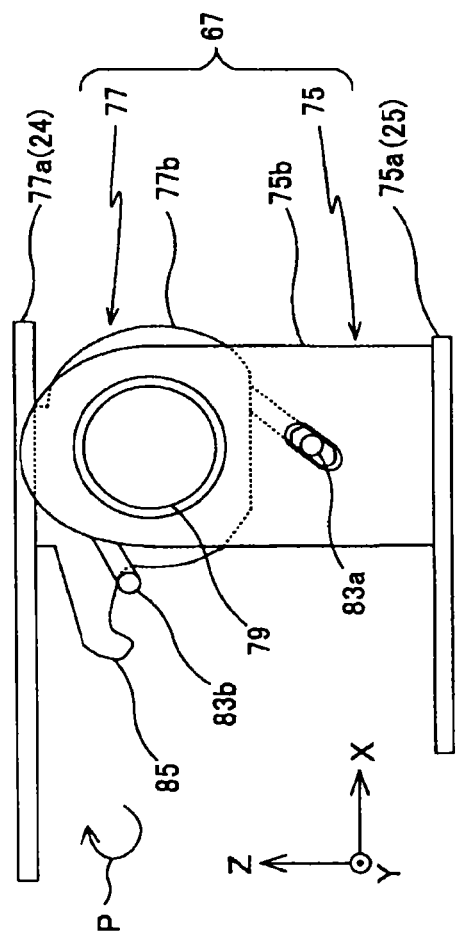
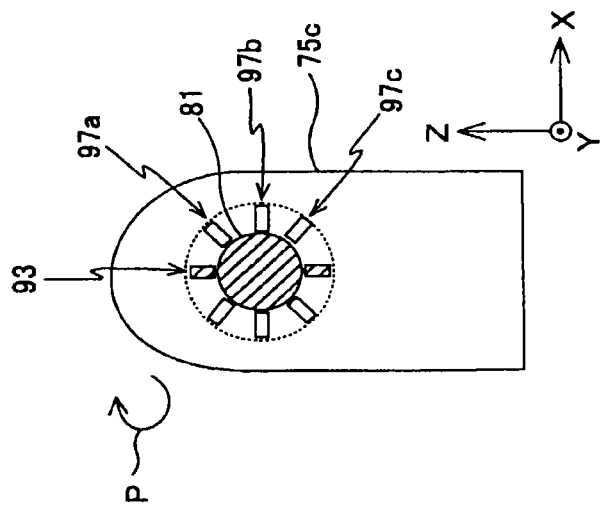
FIG.13A
FIG.13B

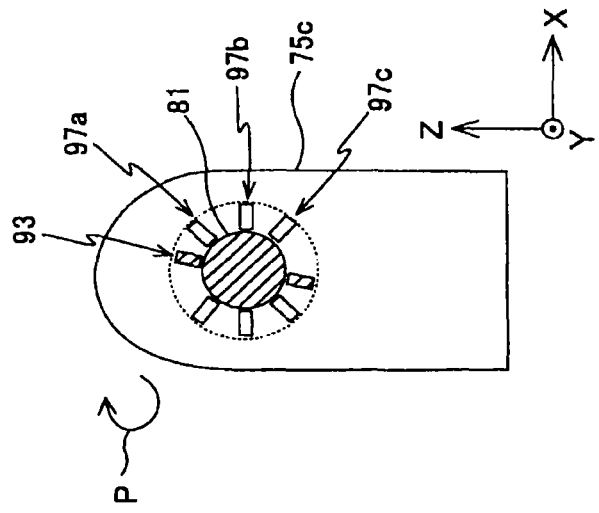
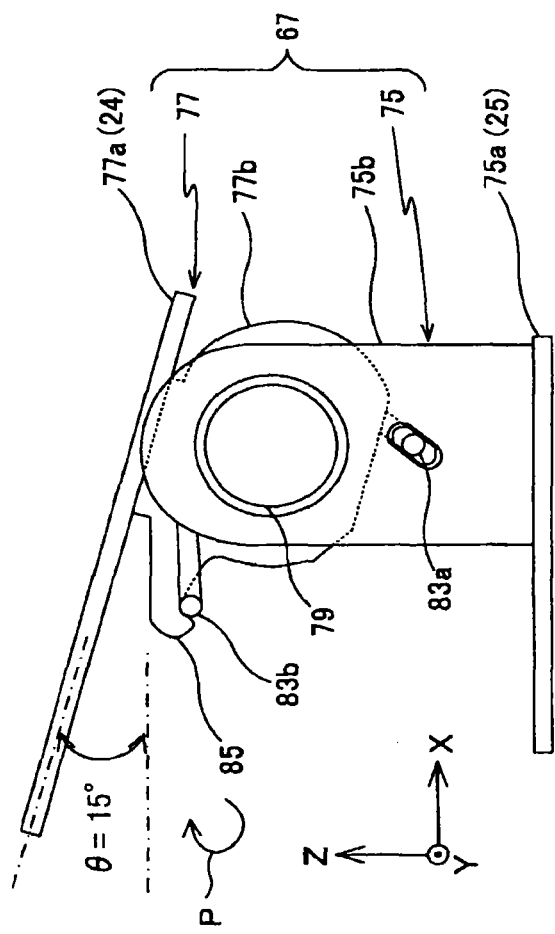
FIG.13D
FIG.13C

COMMUNICATION APPARATUS

CROSS-REFERENCE TO RELATED APPLICATIONS

This application is a continuation application of and claims the benefit of priority from U.S. application Ser. No. 13/337,727, filed Dec. 27, 2011, which is based on Japanese Priority Application No. 2011-006370 filed on Jan. 14, 2011. The entire contents of the above-identified applications are incorporated herein by reference.

BACKGROUND OF THE INVENTION

1. Field of the Invention

The present invention relates to a communication apparatus and more specifically, to a portable communication apparatus inputting an image of an object and that sends the image data of the input image via a network.

2. Description of the Related Art

When having a conference between remote areas, a video conference with two-way communication of image and voice by a communication apparatus has been adopted.

Such a communication apparatus generally includes an electronic camera to obtain an image of an object, a control board for data processing the image of the object input by the electronic camera, and sending the data, an enclosure for housing the control board, and the like.

Among such kind of communication apparatuses, there is known a type in which the electronic camera is attached to the enclosure via a movable arm (for example, in Japanese Laid-open Patent Publication NO. 2002-262250). In such a communication apparatus, an object can easily be captured within a photographing field by the electronic camera by changing the position of the electronic camera with an operation of the movable arm.

arm always protrude from the enclosure. Therefore, it is not convenient for carrying the communication apparatus.

SUMMARY OF THE INVENTION

The present invention is made in light of the above problems, and may provide a communication apparatus having good portability in addition to being capable of capturing an object within a photographing field.

The present invention has been made based on the knowledge the inventors have thus obtained and has the following configurations.

According to an embodiment, there is provided a communication apparatus including: an image input unit that includes an image input member that inputs an image of an object and a retaining member that retains the image input member at its one edge; an enclosure that includes its inside a data sending unit for sending image data of the image input by the image input member via a network, and to which a concave portion is formed at its one side surface; a uniaxial hinge device that includes a first hinge member and a second hinge member rotatably connected with each other and capable of rotating around a first axial line that extends substantially parallel to the one side surface in the concave portion with respect to each other, the first hinge member being connected to the enclosure with being housed in the concave portion and the second hinge member being connected to the other edge of the retaining member; wherein the image input unit is being rotated via the uniaxial hinge device around the first axial line with respect to the enclosure between a housing position where being housed in the concave portion and a protruding position where protruding from the concave portion.

With the above structure, a communication apparatus having a good portability in addition to being capable of capturing an object within a photographing field can be provided.

BRIEF DESCRIPTION OF THE DRAWINGS

Other objects, features and advantages of the present invention will become more apparent from the following detailed description when read in conjunction with the accompanying drawings.

FIG. 1A and FIG. 1B are perspective views showing an appearance of a video conference apparatus in an unused condition;

FIG. 9A and FIG. 9B are perspective views of a uniaxial hinge device of the image input device;

FIG. 10A to FIG. 10C are views for explaining the operation of a helical torsion spring of the uniaxial hinge device;

FIG. 11A is a side view of the uniaxial hinge device near the cam device;

FIG. 11B is a cross-sectional view taken along a B-B line in FIG. 11A;

FIG. 13A to FIG. 13F are views for explaining the operation of the uniaxial hinge device;

DETAILED DESCRIPTION OF THE PREFERRED EMBODIMENTS

Figure 1A:
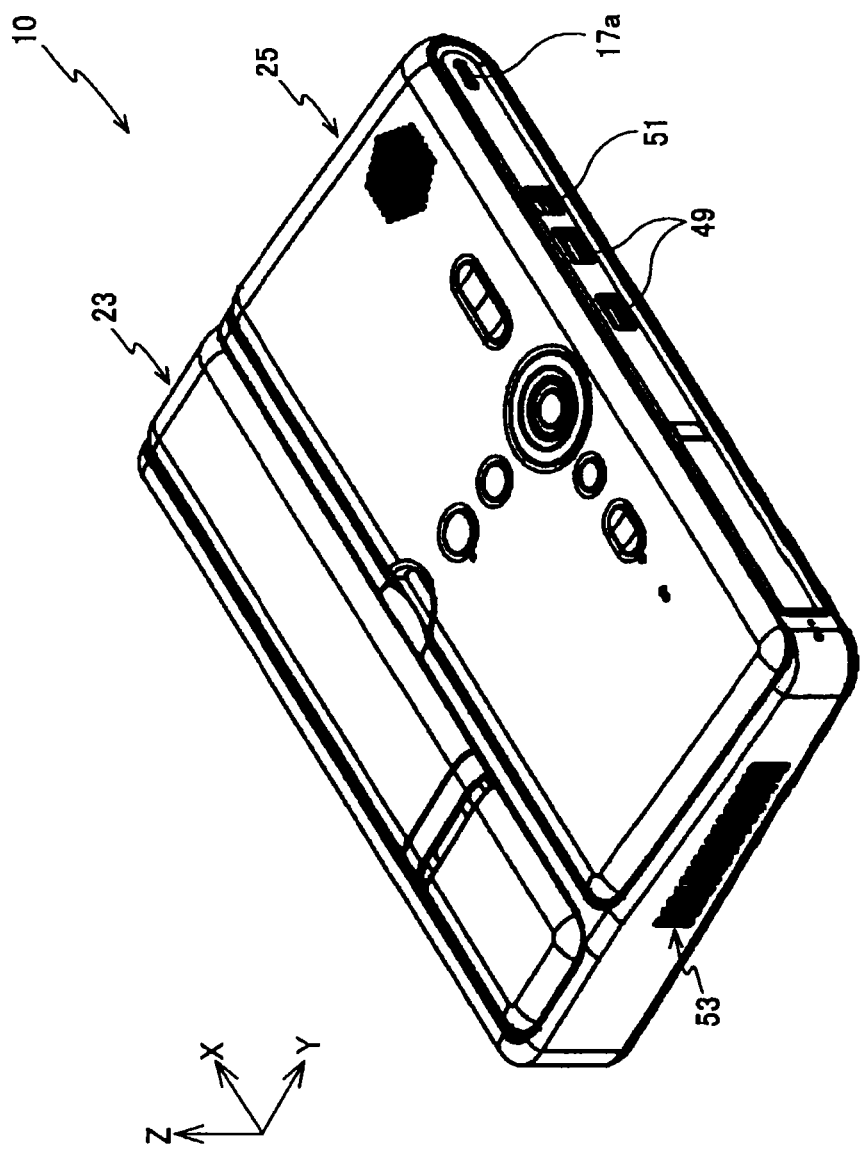

The invention will be now described herein with reference to illustrative embodiments. Those skilled in the art will recognize that many alternative embodiments can be accomplished using the teachings of the present invention and that the invention is not limited to the embodiments illustrated for explanatory purposes.

Next, embodiments of the present invention will be described below with reference to drawings.

It is to be noted that, in the explanation of the drawings, the same components are given the same reference numerals, and explanations are not repeated.

An embodiment will be explained with reference to FIG. 1A to FIG. 21.

FIG. 1A and FIG. 1B are perspective views showing the appearance of a video conference apparatus, which is an embodiment of a communication apparatus, in not-in-use condition. The video conference apparatus 10 appears thin, narrow, long and substantially rectangular (substantially flat plate shape) in total when not in use, as shown in FIG. 1A and FIG. 1B. The video conference apparatus 10 is positioned on a desk or a table, for example, parallel to a horizontal plane in FIG. 1A and FIG. 1B.

The longitudinal direction of the video conference apparatus will be referred to as an X-axis direction, a direction perpendicular to the X-axis direction in the horizontal plane is referred to as a Y-axis direction, and a direction perpendicular to both the X-axis direction and the Y-axis direction in the horizontal plane will be referred to a Z-axis direction (vertical direction) hereinafter. The direction shown by each of arrows X, Y, Z expresses a plus (+) direction and the opposite direction expresses a minus (−) direction.

Figure 2:
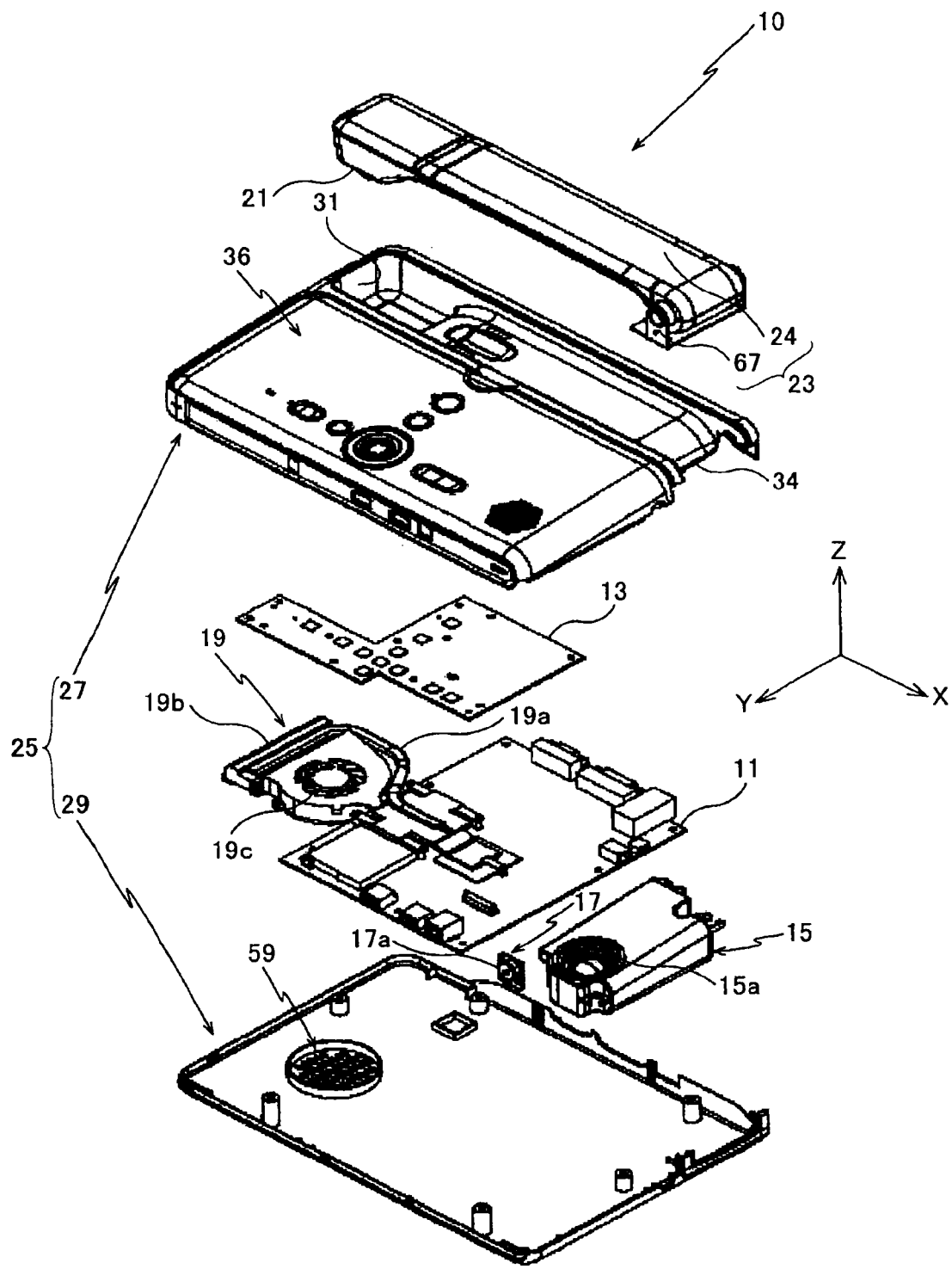
FIG. 2 is an exploded perspective view of the video conference apparatus.

FIG. 2 is an exploded perspective view showing the video conference apparatus 10. The video conference apparatus 10, as shown in FIG. 2, includes an image input device 23, a control board 11, a voice data processing board 13, a voice output device 15 including a speaker 15a, a voice input device 17 including a microphone 17a, a board cooling system 19, an enclosure 25 housing such components, and the like.

The image input device 23 is composed of an image input unit 24 and a uniaxial hinge device 67 that connects the image input unit 24 and the enclosure 25. The image input unit 24 has an elongated shape as a whole, and one end in the longitudinal direction is connected to the uniaxial hinge device 67 and an electronic camera 21 (an image input member) is provided on the other end in the longitudinal direction. The electronic camera 21 inputs an image of an object through its taking lens 21a (see FIG. 6), converts the input image to data, and sends it to the control board 11. The structure of the image input device 23 will be explained later in detail.

The control board 11 controls two-way communications of image and voice data with an external video conference apparatus (not shown in the drawings) via a network such as an INTERNET, for example. The control board 11 processes image data sent from the electronic camera 21, and sends the processed image data to the external video conference apparatus. The control board 11 further processes image data sent from the external video conference apparatus, and sends the processed image data to an image display device (an external device) such as a projector device 68 (see FIG. 20), a monitor device (not shown in the drawings) or the like.

The voice data processing board 13 processes voice data sent from the external video conference apparatus, sends the processed voice data to the voice output device 15, processes voice data sent from the voice input device 17, and sends the processed voice data to the external video conference apparatus, by an instruction from the control board 11.

The voice output device 15 converts the voice data sent from the voice data processing board 13 to voice sound to be output from the speaker 15a.

The voice input device 17 inputs voice sound from the microphone 17a, converts the input voice sound to voice data, and sends the voice data to the voice data processing board 13.

Figure 3:
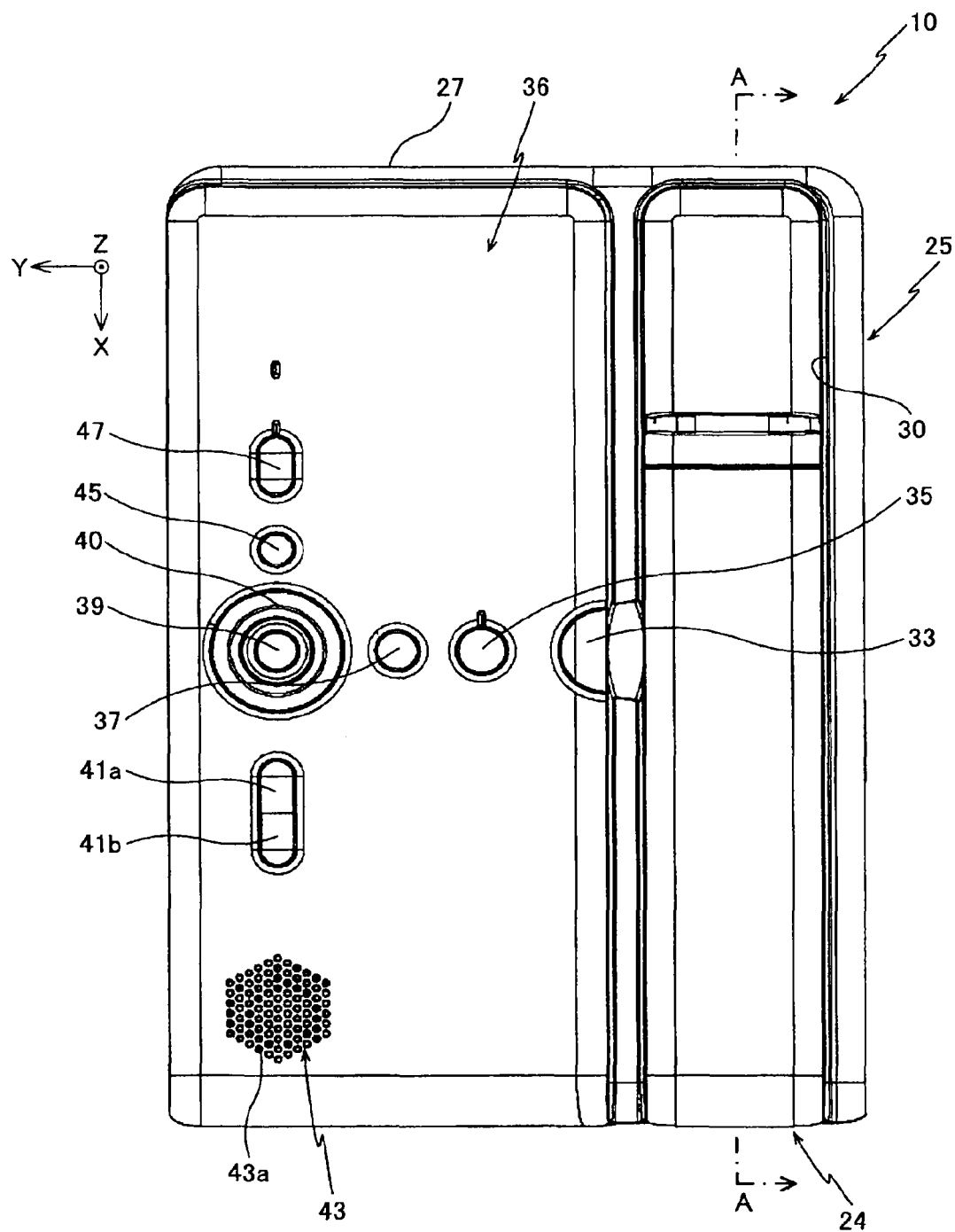
FIG. 3 is a plan view of the video conference apparatus.
Figure 4:
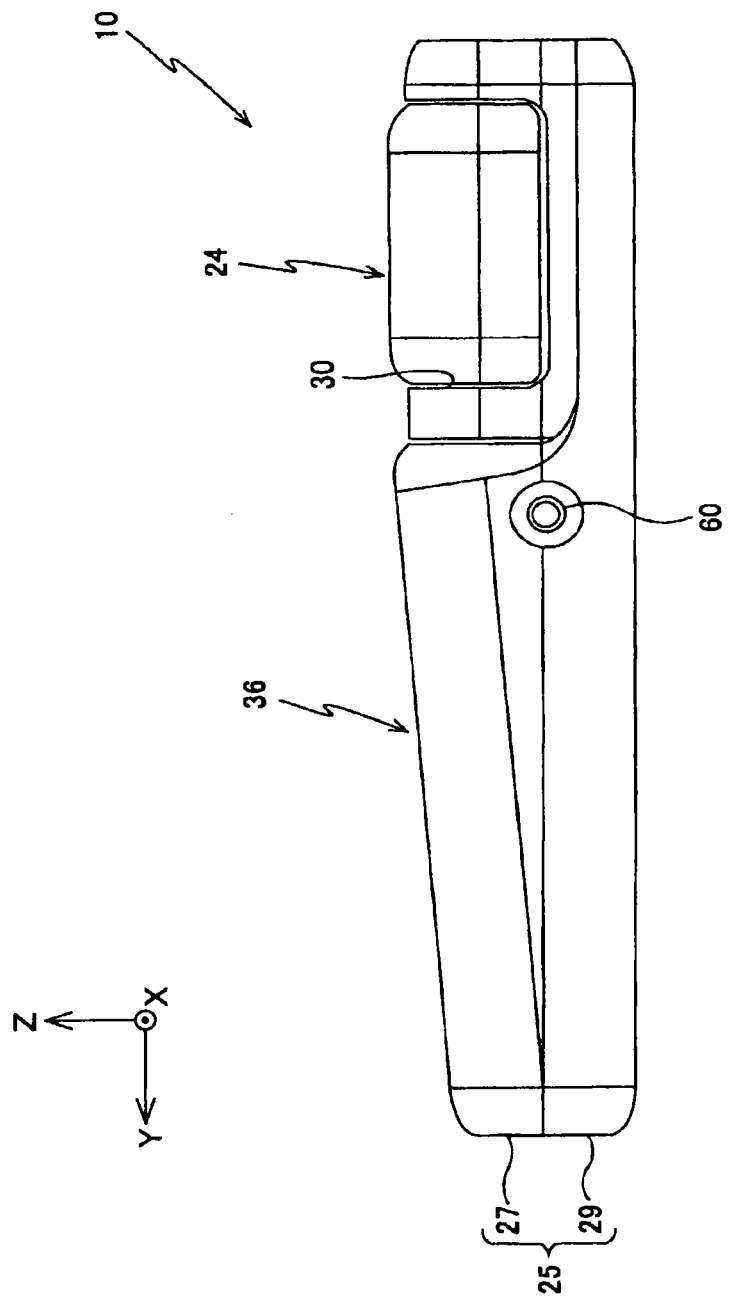
FIG. 4 is a side view of the video conference apparatus.

The enclosure 25 has a rectangular outer shape about A4 size in a plan view as shown in FIG. 3. The width of the enclosure 25 may be almost constant (about 20 mm to 40 mm, for example) as shown in FIG. 4.

Figure 5:
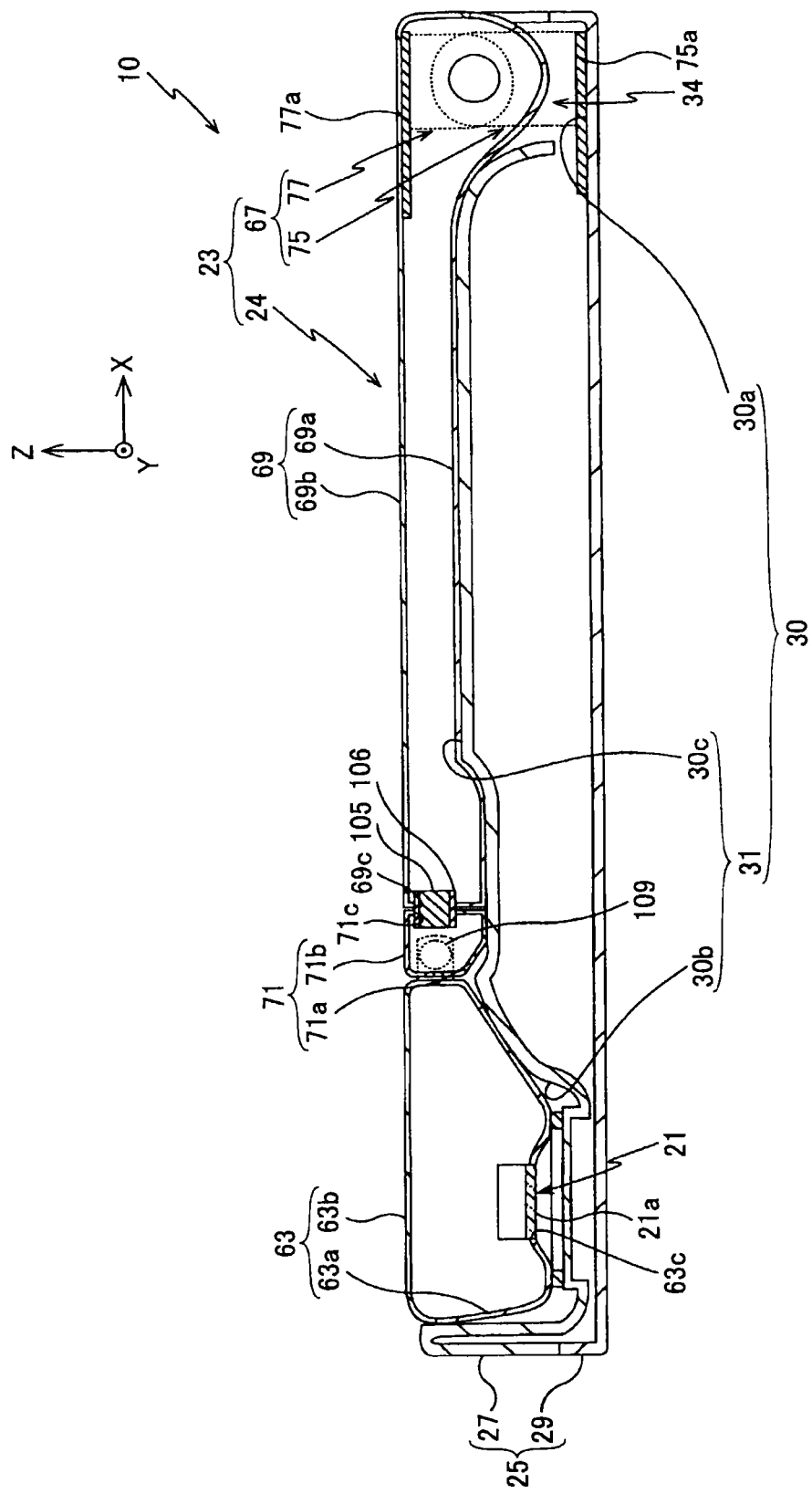
FIG. 5 is a cross-sectional view taken along an A-A line in FIG. 3.

As can be understood from FIG. 3 and FIG. 5 in total, a joggle concavity 30 having a rectangular shape whose longitudinal direction is the X-axis direction and extending over almost all the area of the enclosure 25 in the X-axis direction in a plan view is provided at the upper surface of the enclosure 25 near the −Y side edge (bottom edge of the enclosure 25 in FIG. 3). The joggle concavity 30 is composed of deep concavities 30a and 30b respectively provided at its +X side edge (right side in FIG. 5) and −X side edge (left side in FIG. 5) and a shallow concavity 30c provided between the deep concavities 30a and 30b. In FIG. 5, the control board 11 and the like housed in the enclosure 25 are not shown.

The enclosure 25 is composed of an upper cover 27 and a lower cover 29 detachably connected with each other in a depth direction (upper and lower direction in FIG. 2) as shown in FIG. 2. The upper cover 27 is formed in a thin box shape that is open toward the −Z side (lower side in FIG. 2). The lower cover 29 is formed in a thin box shape that is open toward the +Z side (upper side in FIG. 2).

A joggle concavity 31 having a rectangular shape in a plan view is provided near the −Y side edge of the upper surface of the upper cover 27. The longitudinal direction of the joggle concavity 31 is the X-axis direction. The joggle concavity 31 composes the rest of the joggle concavity 30 except for the deep concavity 30a at the +X side, in other words, the deep concavity 30b at the −X side and the shallow concavity 30c A notch 34 is formed at +X side of the bottom surface that defines the joggle concavity 31. It means that the deep concavity 30a at the +X side is formed at a position corresponding to the notch 34 at the top surface of the enclosure 25, as shown in FIG. 5. The upper surface of the upper cover 27, in other words, a part at the +Y side of the joggle concavity 31 at the upper surface of the enclosure 25, is almost flat; the part will be referred as a flat part 36 hereinafter.

As shown in FIG. 3, plural (for example four) operation buttons are embedded at the center part in the X-axis direction of the flat part 36. The operation buttons are embedded spaced apart in the Y-axis direction. These four operation buttons may be an unlock button 33, a power button 35 for supplying and terminating power to the video conference apparatus 10, a line button 37 for connecting and disconnecting to the INTERNET line, and a selection button 39 for selecting items for a menu image plane displayed on a monitor device by the monitor device itself or a screen by the projector device 68, provided from the joggle concavity 30 side in this order. A cursor 40 for selecting the items of the menu image plane is embedded near the outer periphery of the selection button 39 at the flat part 36 to surround the outer periphery of the selection button 39. The unlock button 33 is used for unlocking the lock of a locking device 117, which will be explained later, of the image input unit 24 housed in the joggle concavity 30.

Volume control buttons 41a and 41b for adjusting volume of voice audio output from the speaker 15a are embedded side-by-side at the +X side of the selection button 39 at the flat part 36.

Volume output holes 43 composed of a lot of through holes 43a for outputting voice audio from the speaker 15a to outside is formed at the +X side of the volume control buttons 41a and 41b at the flat part 36.

A menu button 45 for displaying the menu image plane on the display of the monitor device or on the screen, for example, and a microphone mute button 47 are embedded at the −X side of the selection button 39 at the flat part 36 from the selection button 39 side in this order.

The buttons and the cursor placed at the flat part 36 are provided to engage members placed below for performing desired operations when being pushed. Especially, the buttons and the cursor, except for the unlock button 33, are placed so as to correspond to terminals on the voice data processing board 13. The upper surfaces of the buttons and the cursor are almost in a same plane as the upper surface of the flat part 36 (see FIG. 4).

As for the video conference apparatus 10, the positions of the buttons and the cursor may be determined such that a user may easily handle them when the user is positioned at the +Y side of the video conference apparatus 10. As for such a case, the unlock button 33, the power button 35, and the line button 37, which are not frequently used, may be positioned at a far side from the user while the volume control buttons 41*a* and 41*b*, the selection button 39, the cursor 40, the menu button 45, and the microphone mute button 47, which are frequently used, are aligned at a nearest side of the user. As the unlock button 33, the power button 35 and the line button 37 are aligned from the far side to the front side in an operation order for starting the video conference apparatus 10, it is very simple and usability of them is high.

As shown in FIG. 1A, the microphone 17*a* is embedded at the edge at the +X side of the side surface at the +Y side of the enclosure 25. Further, USB terminals 49 for inputting and outputting between external devices, a LAN terminal 51 for communication, and the like are embedded at the middle part in the X-axis direction of the side surface at the +Y side of the enclosure 25. An air exit 53 composed of a lot of through holes in a slit shape extending in the Z-axis direction is formed at the side surface at the −X side of the enclosure 25.

As shown in FIG. 1B, image output terminals 55 to be connected to the control board 11, a LAN terminal 57 for communication and the like are embedded at the side surface at the −Y side of the enclosure 25. The image display device such as the projector device 68 (see FIG. 20), the monitor device or the like is connected to the image output terminal 55 and an image sent from the external video conference apparatus is displayed on the image display device. Further, as shown in FIG. 4, a power jack 60 is embedded at the side surface at the +X side of the enclosure 25.

Referring back to FIG. 2, the board cooling system 19 includes a heat pipe 19*a* one end of which is connected to the control board 11, a thin heat sink 19*b* to which the other end of the heat pipe 19*a* is connected, a fan device including a lateral type fan 19*c* and the like.

The heat sink 19*b* is positioned adjacent to the air exit 53 (see FIG. 1B) in the enclosure 25, and heat generated at the control board 11 and the voice data processing board 13 is transferred outside from the air exit 53 via the heat pipe 19*a* and the heat sink 19*b*. The fan 19*c* is positioned to correspond to an air inlet 59 composed of a lot of through holes formed at the lower cover 29 and adjacent to the heat sink 19*b* for being capable of sending air to the heat sink 19*b*. The air suctioned from the air inlet 59 by the fan 19*c* is sent toward the heat sink 19*b* and transfer (dissipating effect) of the heat from the heat sink 19*b* is increased.

As described above, the board cooling system 19 is formed thin in total to have the enclosure 25 thin as well.

The structure of the image input device 23 will be explained in detail. The image input device 23 composed of the image input unit 24 and the uniaxial hinge device 67 is housed in the joggle concavity 30 as shown in FIG. 5.

The image input unit 24 is housed in the joggle concavity 30 with at least a part except the one end part (a connecting part with the uniaxial hinge device 67) in the longitudinal direction being on the bottom surface defining the joggle concavity 31. Hereinafter, for explanation, a surface of the image input unit 24 that is on the bottom surface defining the joggle concavity 31 is referred as "a contacting surface" (the lower surface in FIG. 5) and a surface opposite to the contacting surface is referred as "a back surface" (the upper surface in FIG. 5).

The back surface of the image input unit 24 may be a flat and may become in a parallel relationship with respect to a horizontal plane when the image input unit 24 is housed in the joggle concavity 30. The contacting surface of the image input unit 24 is formed to have a shape that at least a part of which fits the shape of the bottom surface defining the joggle concavity 31.

As shown in FIG. 3, when the image input unit 24 is housed in the joggle concavity 30, clearances between the image input unit 24 and the sides defining the joggle concavity 30 at the −X side and the +Y side, respectively, have a size small enough (a few millimeters, for example) so that fingers of a user cannot enter therein.

It means that the image input unit 24 is almost fitted with the joggle concavity 30 in the X-axis and the Y-axis directions. In other words, the image input unit 24 has a rectangular shape where the sizes of the back surface of the image input unit 24 in the Y-axis direction and the X-axis direction are slightly smaller than those of the joggle concavity 30 in the Y-axis direction and the X-axis direction, respectively.

As shown in FIG. 4, the back surface of the image input unit 24 is positioned at almost the same height (almost in a same plane) as the flat part 36 of the enclosure 25 when the image input unit 24 is housed in the joggle concavity 30. It means that the upper surface of the video conference apparatus 10 is almost flat when the image input unit 24 is housed in the joggle concavity 30 of the enclosure 25.

Figure 6:
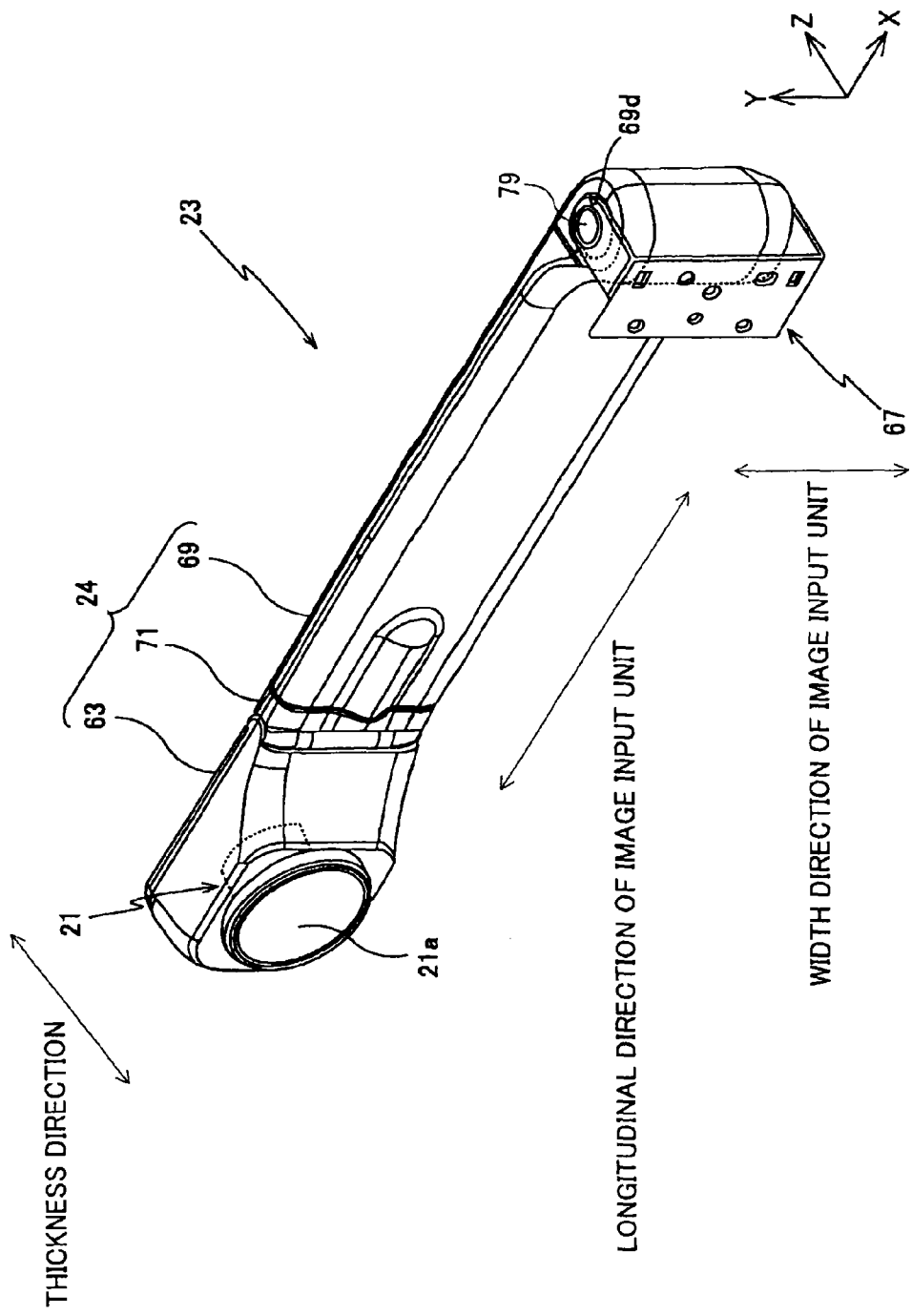
FIG. 6 is perspective view of an image input device of the video conference apparatus.
Figure 7:
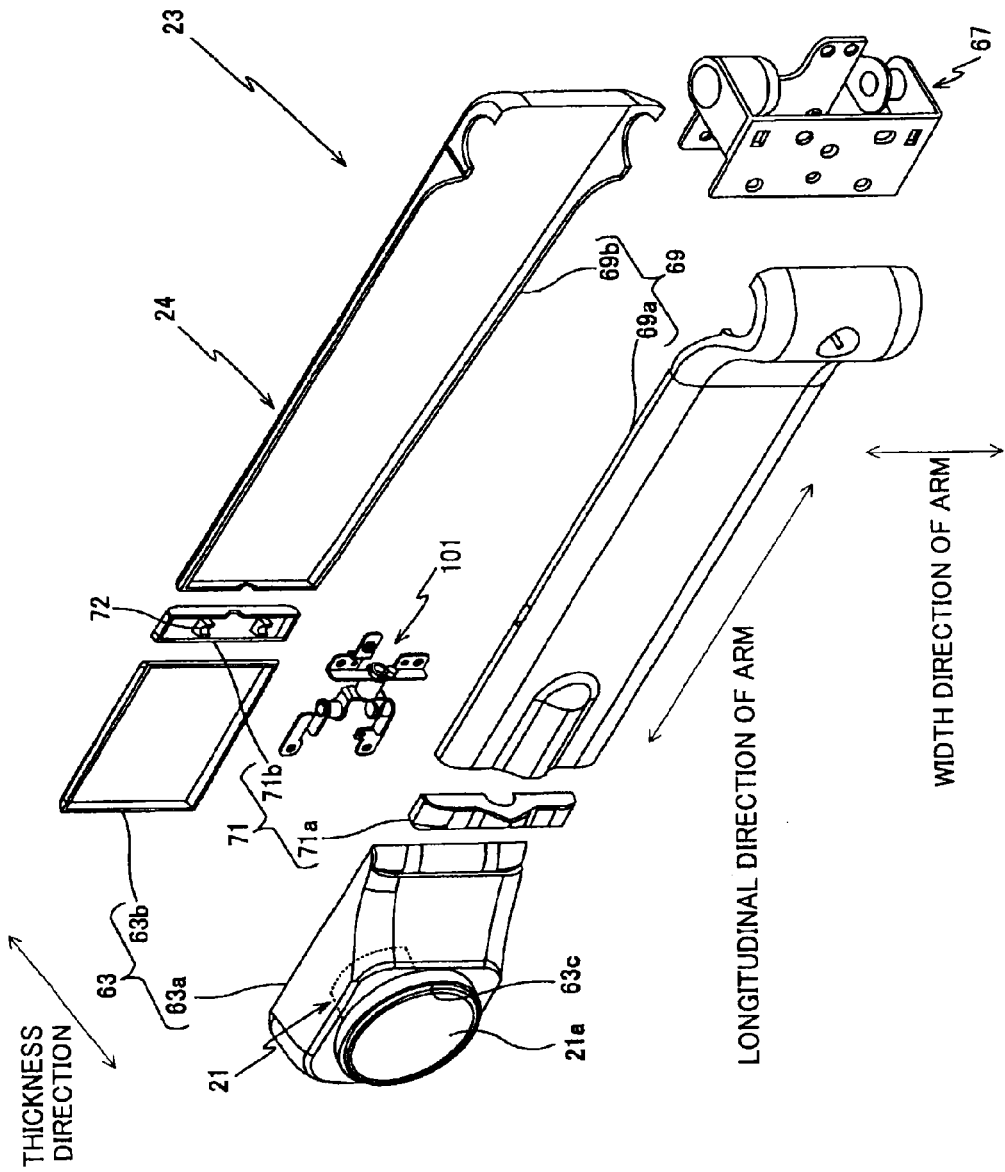
FIG. 7 is an exploded perspective view of the image input device.

The image input unit 24 further includes, as shown in FIGS. 5 to 7, a camera housing unit 63 in which the electronic camera 21 is housed, an arm 69 supported by the enclosure 25 via the uniaxial hinge device 67, a biaxial hinge device 101 (see FIG. 7, FIG. 8 and FIG. 15, not shown in FIG. 5 and FIG. 6) connecting the arm 69 and the camera housing unit 63, a cover unit 71 placed between the arm 69 and the camera housing unit 63 for covering a part of the biaxial hinge device 101 in addition to the electronic camera 21. Here, the arm 69, the cover unit 71, and the camera housing unit 63 serve as a retaining member. The cover unit 71 and the camera housing unit 63 may be a first part of the retaining member while the arm 69 may be a second part of the retaining. The biaxial hinge device 101 may be the connecting device.

As shown in FIG. 5, the camera housing unit 63 is housed in the deep concavity 30*b* at the −X side on the bottom surface defining the deep concavity 30*b*. The camera housing unit 63 has a hollow shape, and the electronic camera 21 is fixed in the hollow.

FIG. 7 is an exploded perspective view of the image input device 23. As shown in FIG. 7, the camera housing unit 63 includes a first housing member 63*a* and a second housing member 63*b* detachably connected in the thickness direction.

At one surface of the first housing member 63*a* in the thickness direction, a circular opening 63*c*, having a size a bit larger than that of the taking lens 21*a* of the camera 21, is formed to have the taking lens 21*a* inserted therein. At least a part of the one surface of the first housing member 63*a* in the thickness direction composes a part of the contacting surface of the image input unit 24 (see FIG. 5). The other surface of the first housing member 63a in the thickness direction composes a connecting surface with the second housing member 63b. The first housing member 63a has a tapered shape whose thickness at the cover unit 71 side is less than that at the circular opening 63c side (see FIG. 5).

One surface of the second housing member 63b in the thickness direction composes a connecting surface with the first housing member 63a. The other side of the second housing member 63b in the thickness direction is flat to compose a part of the back surface of the image input unit 24 (see FIG. 5).

As shown in FIG. 5, the arm 69 has a hollow shape. The front edge part and the middle part of the arm 69 in the longitudinal direction are housed in the shallow concavity 30c on the bottom surface defining the shallow concavity 30c. The base edge part of the arm 69 at its +X side is housed in the deep concavity 30a.

As shown in FIG. 6, insertion holes 69d are provided at both side surfaces at the +Y side and the −Y side at the base edge part of the arm 69 to which shaft portions of the uniaxial hinge device 67 are respectively inserted (only the insertion hole 69d at the +Y side is shown in FIG. 6).

As shown in FIG. 7, the arm 69 is composed of a first arm member 69a and a second arm member 69b detachably connected with each other in the thickness direction. At least a part of one surface of the first arm member 69a in the thickness direction composes a part of the contacting member of the image input unit 24 (see FIG. 5), and the other surface of the first arm member 69a in the thickness direction composes a connecting surface with the second arm member 69b.

One surface of the second arm member 69b in the thickness direction composes a connecting surface with the first arm member 69a, and the other surface of the second arm member 69b in the thickness direction is a flat surface and composes a part of the back surface of the image input unit (see FIG. 5).

Hereinafter, a direction perpendicular to the longitudinal direction and the thickness direction of the arm 69 will be referred to as a width direction.

As shown in FIG. 5, the cover unit 71 has a hollow shape and is housed in the shallow concavity 30c on the bottom surface defining the shallow concavity 30c.

As shown in FIG. 7, the cover unit 71 is composed of a first cover member 71a and a second cover member 71b detachably connected with each other in the thickness direction. At least a part of one surface of the first cover member 71a in the thickness direction composes a part of the contacting surface of the image input unit 24 (see FIG. 5), and the other surface thereof in the thickness direction composes a contacting surface with the second cover member 71b.

One surface of the second cover member 71b in the thickness direction composes a contacting surface with the first cover member 71a, and the other surface thereof in the thickness direction is flat and composes a part of the back surface of the image input unit 24. The structure of the biaxial hinge device 101 will be explained later in detail.

As shown in FIG. 5, the uniaxial hinge device 67 is housed in the deep concavity 30a at the +X side.

Figure 9B:
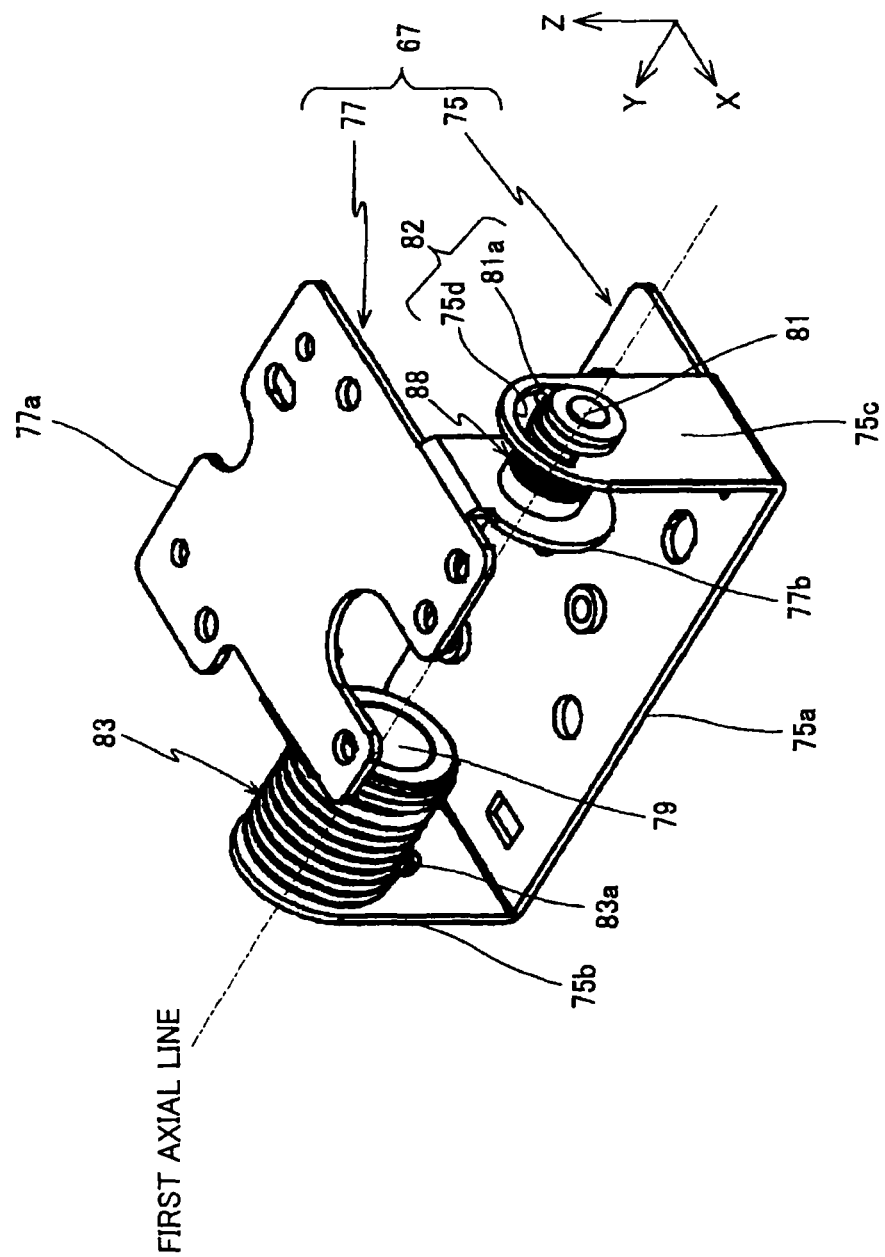

FIG. 9A and FIG. 9B are perspective views showing the appearance of the uniaxial hinge device 67. As shown in FIG. 9A and FIG. 9B, the uniaxial hinge device 67 includes a first hinge member 75, a second hinge member 77, a first shaft member 79, and a second shaft member 81. The first shaft member 79 and the second shaft member 81 rotatably connect the first hinge member 75 and the second hinge member 77 so that the first hinge member 75 and the second hinge member 77 are rotated with respect to each other.

The first hinge member 75 includes a first base member 75a composed of a flat plate part, a first bearing unit 75b protruding upward from the edge at the +Y side of the first base member 75a, and a second bearing unit 75c protruding upward from the edge at the −Y side of the first base member 75a.

The second hinge member 77 includes a second base member 77a composed of a flat plate part having a size shorter than that of the first base member 75a in the Y-axis direction and positioned above the first base member 75a, a first shaft fixing unit 77b at the +Y side extending from the +Y side edge of the second base member 77a to protrude between the first bearing unit 75b and the second bearing unit 75c, and a second shaft fixing unit 77c at the −Y side extending from the −Y side edge of the second base member 77a to protrude between the first bearing unit 75b and the second bearing unit 75c.

The first shaft member 79 is fixed to the first shaft fixing unit 77b at its one edge at the −Y side so that its axis becomes parallel to the Y axis and the other edge at the +Y side is rotatably inserted in a bearing hole formed in the first bearing unit 75b.

The second shaft member 81 is fixed to the second shaft fixing unit 77c at its one edge at the +Y side so that its axis becomes coaxial with that of the first shaft member 79 and the other edge at the −Y side is rotatably inserted in a bearing hole formed in the second bearing unit 75c.

With this structure, the first hinge member 75 and the second hinge member 77 are relatively rotatable around the axis of the first shaft member 79 and the second shaft member 81. Hereinafter, the axis (rotational center) of the first shaft member 79 and the axis (rotational center) of the second shaft member 81 are referred to as a first axial line. The first axial line is parallel to the Y axis and the width direction of the arm 69.

As shown in FIG. 5, the first base member 75a is fixed on the edge part at the +X side of the inside bottom surface of the enclosure 25 (on the bottom surface defining the deep concavity 30a at the +X side) by a bolt or the like to be parallel to the horizontal plane.

The second base member 77a is fixed on the inside surface of the second arm member 69b to be parallel to a flat surface of the second arm member 69b (a part of the back surface of the image input unit 24) by a bolt or the like.

Further, as shown in FIG. 6, the first shaft member 79 of the uniaxial hinge device 67 is inserted in the insertion hole 69d formed at the +Y side of the arm 69 and the second shaft member 81 (not shown in FIG. 6) of the uniaxial hinge device 67 is inserted in the insertion hole 69d formed at the −Y side of the arm 69.

Figure 12:
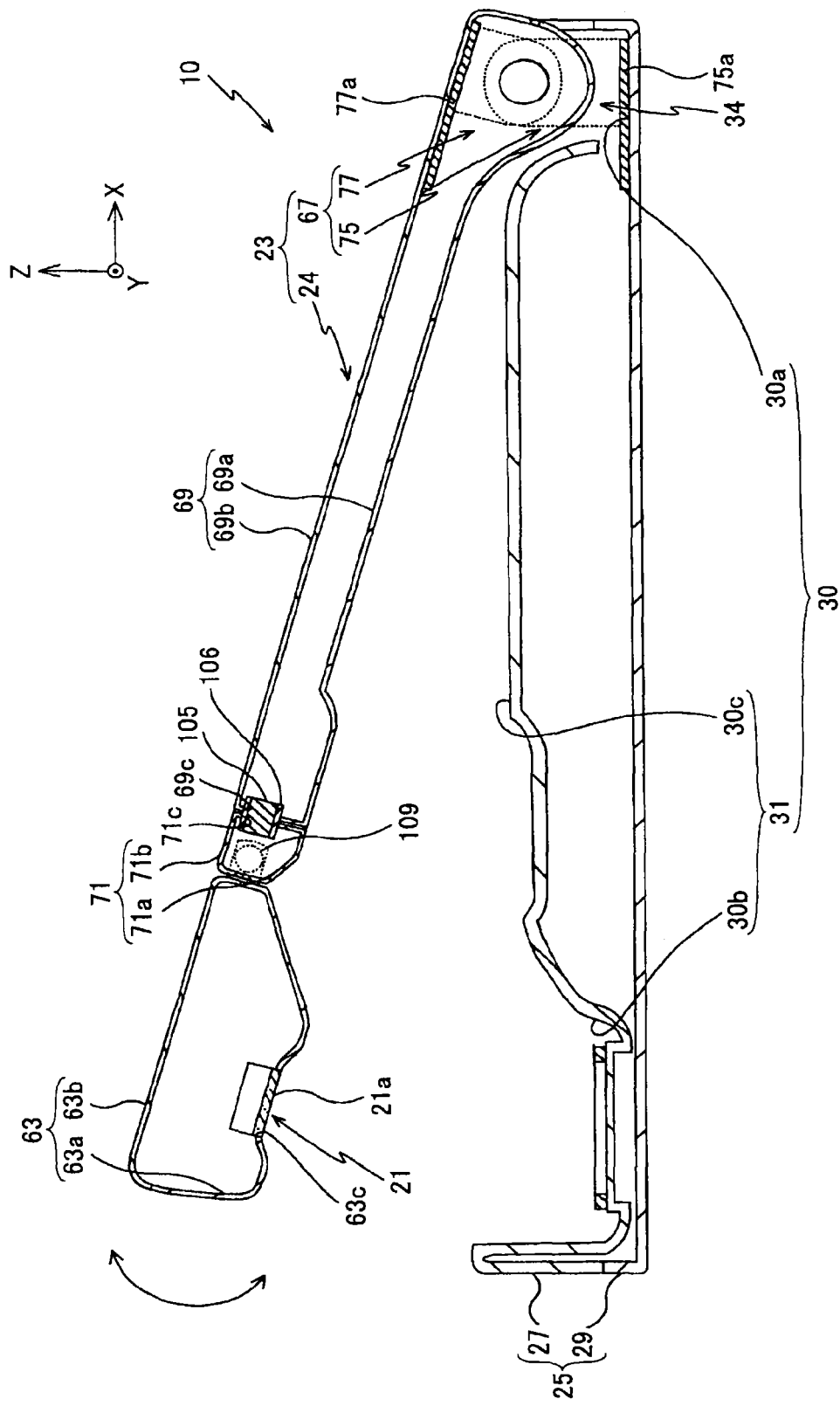
FIG. 12 is a cross-sectional view of the image input device whose image input unit is positioned at a protruding position.

With the above structure, the image input unit 24 is rotatably movable with respect to the enclosure 25 via the uniaxial hinge device 67 around the first axial line. As shown in FIG. 5 and FIG. 12, there is provided enough space in the enclosure 25 so that the base edge part of the arm 69 can rotate without disturbing the enclosure 25 when the uniaxial hinge device 67 is operated to rotate. As the base edge part of the arm 69 is inserted in the deep concavity 30a at the +X side via the notch 34, the base edge part of the arm 69 can rotate without disturbing the enclosure 25.

It means that the image input unit 24 is rotatable between a housing position where it is housed in the joggle concavity 30 (see FIG. 5) and a protruding position where it protrudes from the joggle concavity (see FIG. 12) by the operation (rotating operation) of the uniaxial hinge device 67. The control board 11 and the like housed in the enclosure 25 are not shown in FIG. 12.

As shown in FIG. 9B, there is provided a notch 75d at the second bearing unit 75c that has an arc and fan shape of 135° having an axis of the second shaft member 81 as a center. A projection 81a which is fixed to the second shaft member 81 is inserted in the notch 75d. Therefore, when the second shaft member 81 rotates with respect to the second bearing unit 75c around the first axial line, the projection 81a moves in the notch 75d along the arc of the notch 75d between the edges of the arc.

Concretely, when the first base member 75a and the second base member 77a are in a parallel relationship with each other, as shown in FIG. 9B, the projection 81a is positioned at one end of the arc of the notch 75d. By this positioning, the relative rotation between the first hinge member 75 and the second hinge member 77 toward the closing direction from the condition shown in FIG. 9B is stopped. When the first hinge member 75 and the second hinge member 77 relatively rotate toward the opening direction from the condition as shown in FIG. 9B, the projection 81a moves in the notch 75d toward the other edge along the arc of the notch 75d. Then, when the rotation angle between the first hinge member 75 and the second hinge member 77 becomes 135°, the notch 75d is positioned at the other edge. With this positioning, the relative rotation between the first hinge member 75 and the second hinge member 77 toward the opening direction can be stopped.

The notch 75d and the projection 81a function as a stopper device 82 that defines the range of the relative rotation between the first hinge member 75 and the second hinge member 77. It means that the relative rotation of the first hinge member 75 and the second hinge member 77 is limited so that the angle between the first hinge member 75 and the second hinge member 77 is in the range 0° to 135° in this embodiment.

Therefore, the range of the relative rotation of the image input unit 24 with respect to the enclosure 25 is limited to the range 0° to 135° when it is defined that the angle is assumed as 0° when the image input unit 24 is positioned at the housing position.

As shown in FIG. 9A and FIG. 9B, the first shaft member 79 is coaxially inserted in a helical torsion spring 83 to penetrate the helical torsion spring 83. The helical torsion spring 83 is attached to the first bearing unit 75b at its first end 83a at the +Y side, and a second end 83b at the -Y side of which slidably engages a lower surface of a protruding portion 85 that protrudes from the first shaft fixing unit 77b toward the outer direction in a diameter direction of the first shaft member 79.

Figure 10C:
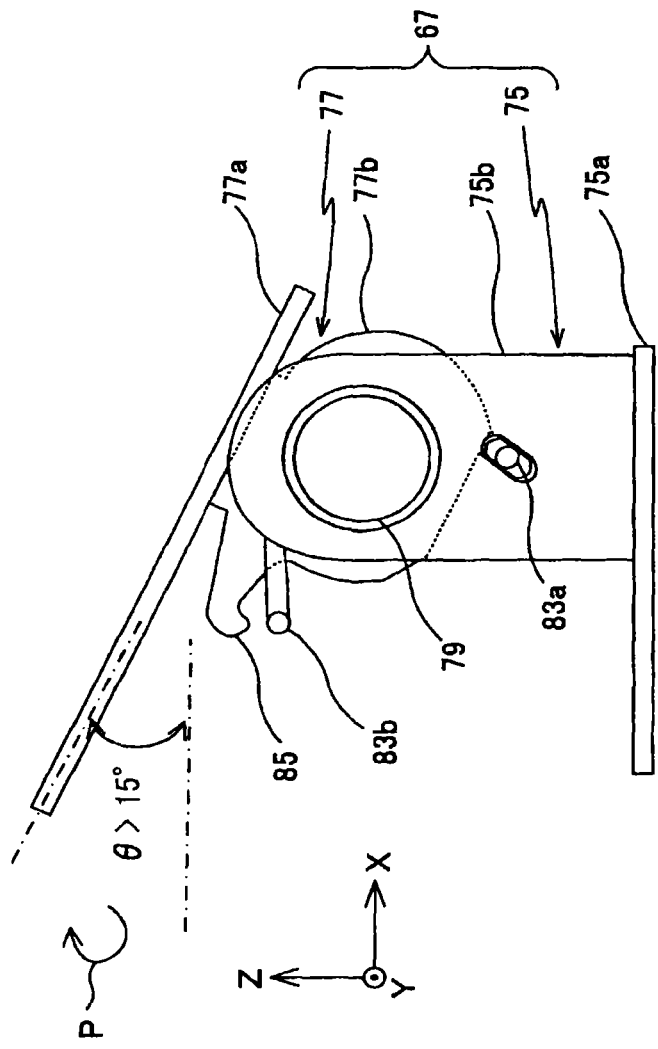

FIG. 10A to FIG. 10C are side views of the uniaxial hinge device 67.

When the second end 83b of the helical torsion spring 83 (the first end 83a thereof is also shown) is engaged with the base edge of the protruding portion 85, as shown in FIG. 10A, the helical torsion spring 83 is in the most compressed condition (where the resilient (restoring) force is the greatest).

When the second end 83b of the helical torsion spring 83 slides to the front edge from the base edge part of the protruding portion 85 with the relative rotation of the first hinge member 75 and the second hinge member 77 toward an opening direction and the angle between the first hinge member 75 and the second hinge member 77 becomes 15°, as shown in FIG. 10B, the helical torsion spring 83 is in the most extended condition (where the resilient force is zero).

It means that the helical torsion spring 83 is set to have a movable stroke (effective stroke) of having the angle between the first hinge member 75 and the second hinge member 77 kept within a range between not less than 0° and not more than 15° while pushing the first hinge member 75 and the second hinge member 77 to increase the angle between them as shown in FIG. 10A and FIG. 10B.

The first hinge member 75 and the second hinge member 77 are pushed to the opening direction when the angle between the first base member 75a and the second base member 77a is in the range 0° to 15°. However, when the angle between the first base member 75a and the second base member 77a exceeds 15°, as shown in FIG. 10C, the engagement between the helical torsion spring 83 and the protruding portion 85 is released and the helical torsion spring 83 does not function anymore to push the first hinge member 75 and the second hinge member 77 toward the opening direction.

A moment of the spring force (resilient force) of the helical torsion spring 83 is set to have a force capable of at least rotating the image input unit 24 at the housing position toward the protruding position with respect to the enclosure 25, in other words, greater than the sum of a moment of gravity around the first axial line that is applied to the image input unit 24 at the housing position and a retaining torque generated by a group of plate springs 88, which will be explained later. Hereinafter, the moment of gravity around the first axial line that is applied to the image input unit 24 will be referred to as "a self-weight moment of the image input unit 24" or just "a self-weight moment".

FIG. 11A is a side view of an edge of the uniaxial hinge device 67 at the -Y side when seen from the +X side. As shown in FIG. 11A, the second shaft member 81 is coaxially inserted in plural of (for example three) thin cylindrical plate springs 87 arranged side-by-side with each other, a cylindrical first spacer 89a and a cylindrical second spacer 89b placed at the +Y side and the -Y side of the three plate springs 87, respectively, with the three plate springs 87 interposed in between. Each of the three plate springs 87 deforms in its axis direction. The three plate springs 87 are held between the second shaft fixing unit 77c and the second bearing unit 75c via the first spacer 89a and the second spacer 89b, respectively, in compressed conditions. Hereinafter, for explanation, the three plate springs 87 will be referred to as a group of plate springs 88.

The second spacer 89b is fixed to the second shaft member 81 and rotates around the first axial line with the second hinge member 77. FIG. 11B is a cross-sectional view take along a B-B line in FIG. 11A. As shown in FIG. 11B, two convex cams 91, each protruding toward the -Y direction from a surface of the second spacer 89b at the -Y side, are respectively formed at two positions having the second shaft member 81 interposed in between in the diameter direction of the second shaft member 81.

As shown in FIG. 13A and FIG. 13B, when the first base member 75a and the second base member 77a are in a parallel relationship with each other, the two convex cams 91 are positioned up and down with a predetermined distance in between. The convex cams 91 are pushed (touched) to the second bearing unit 75c by the function of the group of plate springs 88. Hereinafter, as for explanation, the pair of convex cams 91 will be referred to as a convex cam pair 93.

The pushing force of pushing the convex cam pair 93 toward the second bearing unit 75c by the group of plate springs 88 generates a retaining torque retaining the relative position of the first hinge member 75 and the second hinge member 77 around the first axial line, in other words, the position of the image input unit 24 with respect to the enclosure 25 around the first axial line.

The magnitude of the retaining torque is set to be capable of retaining the image input unit 24 at the respective position when the angle of the back surface of the image input unit 24 with respect to the horizontal plane is in the range 45° to 135°. It means that the retaining torque is set to be greater than the self-weight moment when the angle is in the range 45° to 135°, and smaller than the self-weight moment when the angle of the back surface of the image input unit 24 with respect to the horizontal plane is in the range 0° to 45°. However, the magnitude of the retaining torque is smaller than the moment of the spring force (resilient force) of the helical torsion spring 83. Hereinafter, the group of plate springs 88 may be referred to as a retaining torque generation device 88 by using a same numeral, as well.

Therefore, when the rotation angle of the image input unit 24 with respect to the enclosure 25 is in the range 15° to 45°, the self-weight moment is larger than the retaining torque generated by the group of plate springs 88 so that the position could not be retained except that the image input unit 24 is retained at the rotation angle of 15° from the housing position where the helical torsion spring 83 can push it toward the direction shown by the arrow P (see FIG. 13C).

As shown in FIG. 11A and FIG. 11B, there is provided a first concave cam pair 97a composed of a pair of concave cams 95a, a second concave cam pair 97b composed of a pair of concave cams 95b, and a third concave cam pair 97c composed of a pair of concave cams 95c, each pair being capable of fitting with the convex cam pair 93, at a surface at the +Y side of the second bearing unit 75.

The pair of concave cams 95a is formed to interpose the second shaft member 81 in its diameter direction inclined for 45° in the direction shown by the arrow P with respect to the Z-axis direction.

The pair of concave cams 95b is formed to interpose the second shaft member 81 in its diameter direction inclined for 90° in the direction shown by the arrow P with respect to the Z-axis direction.

The pair of concave cams 95c is formed to interpose the second shaft member 81 in its diameter direction inclined for 135° in the direction shown by the arrow P with respect to the Z-axis direction.

The rotating operation of the image input unit 24 with respect to the enclosure 25 will be explained with reference to FIG. 13A to FIG. 14D. Although only the uniaxial hinge device 67 is shown in FIG. 13A to FIG. 14D, it is assumed, in the following explanation, that the first base member 75a is fixed parallel to the inside bottom surface of the enclosure 25 (the bottom surface defining the deep concavity 30a at +X side) and the second base member 77a is fixed parallel to the inside bottom surface of the second arm member 69b.

First, an external moment is applied against the moment of the resilient force of the helical torsion spring 83 and the retaining torque generated by the group of plate springs 88 is applied between the image input unit 24 and the enclosure 25, so that the back surface of the image input unit 24 is retained to be in a parallel relationship with the horizontal plane (see FIG. 13A).

At this time, the image input unit 24 take the housing position (see FIG. 5), and the convex cam pair 93 is positioned up and down having a predetermined distance in between (see FIG. 13B).

When the external moment is removed from the condition shown in FIG. 13A, the image input unit 24 quickly rotates (pop-up style) with respect to the enclosure 25 in a direction shown as the arrow P and is retained at a position where the angle of the back surface with respect to the horizontal plane is 15° by the function of the helical torsion spring 83 (see FIG. 13C). With the rotation of the image input unit 24, the convex cam pair 93 also rotates with respect to the second bearing unit 75c from the position shown in FIG. 13B toward the direction as shown by the arrow P for 15° (see FIG. 13D).

Figure 13F:
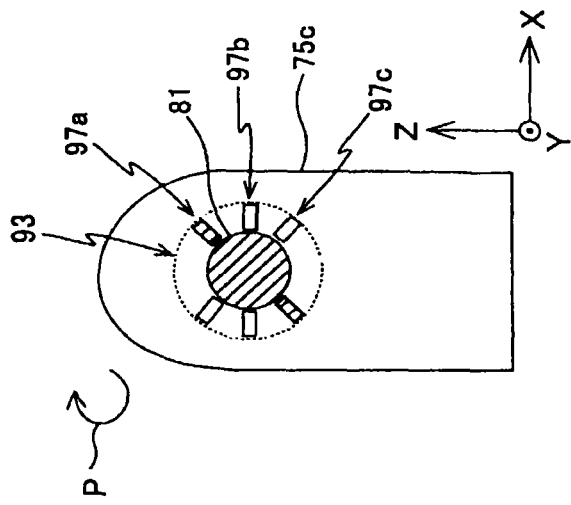

When the image input unit 24 is further rotated with respect to the enclosure 25 in the direction as shown by the arrow P for 30° against the self-weight moment and the retaining torque generated by the group of plate springs 88 from the condition shown in FIG. 13C (see FIG. 13E), synchronously, the convex cam pair 93 also rotates with respect to the second bearing unit 75c from the position shown in FIG. 13D toward the direction shown by the arrow P for 30° to be fitted with the first concave cam pair 97a (see FIG. 13F). With this operation, the image input unit 24 is retained with a fixed condition at the position where the angle between the back surface of the image input unit 24 with respect to the horizontal plane is 45° (see FIG. 13E).

When the external moment is removed when the image input unit 24 is rotated from the position shown in FIG. 13C in the direction shown by the arrow P for less than 30° with respect to the enclosure 25, the self-weight moment of the image input unit 24 exceeds the retaining torque generated by the group of plate springs 88, so that the image input unit 24 is rotated in the direction opposite to that shown by the arrow P to move back to the position as shown in FIG. 13C.

Figure 13E:
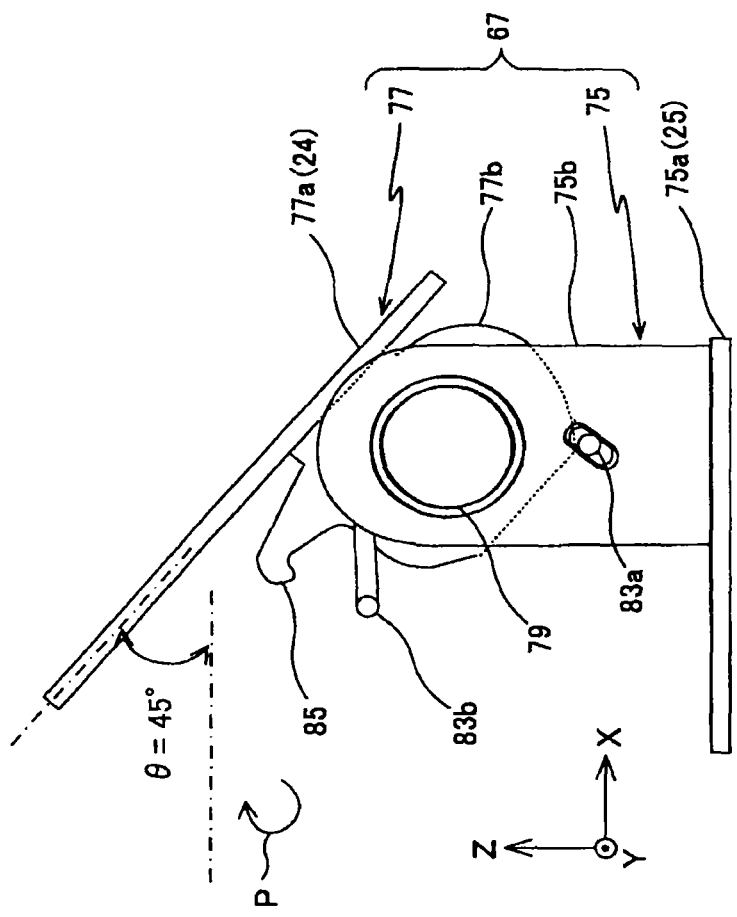

When applying an external moment to the image input unit 24, as shown in FIG. 13E, against its self-weight moment and the retaining torque generated by the group of plate springs 88, the fitting between the convex cam pair 93 and the first concave cam pair 97a is released so that the image input unit 24 and the convex cam pair 93 synchronously move in the direction as shown by the arrow P with respect to the enclosure 25. Then, when the image input unit 24 rotates 45° from the condition as shown in FIG. 13E (see FIG. 14A), the convex cam pair 93 also rotates in the direction as shown by the arrow P for 45° from the condition as shown in FIG. 13F to be fitted with the second concave cam pair 97b (see FIG. 14B). With this, the image input unit 24 is retained with a fixed condition with respect to the enclosure 25 so that the angle between the back surface thereof with respect to the horizontal plane is substantially 90° (see FIG. 14A).

When the external moment is removed when the image input unit 24 is rotated in the direction as shown by the arrow P for less than 45° with respect to the enclosure 25 from the condition as shown in FIG. 13E, the image input unit 24 is retained at the position as it is because the self-weight moment of the image input unit 24 is below the retaining torque generated by the group of plate springs 88.

Figure 14B:
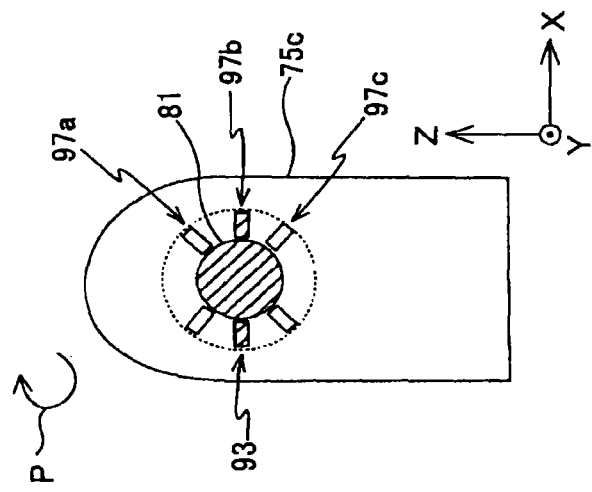
FIG. 14A to FIG. 14D are views for explaining the operation of the uniaxial hinge device.
Figure 14A:
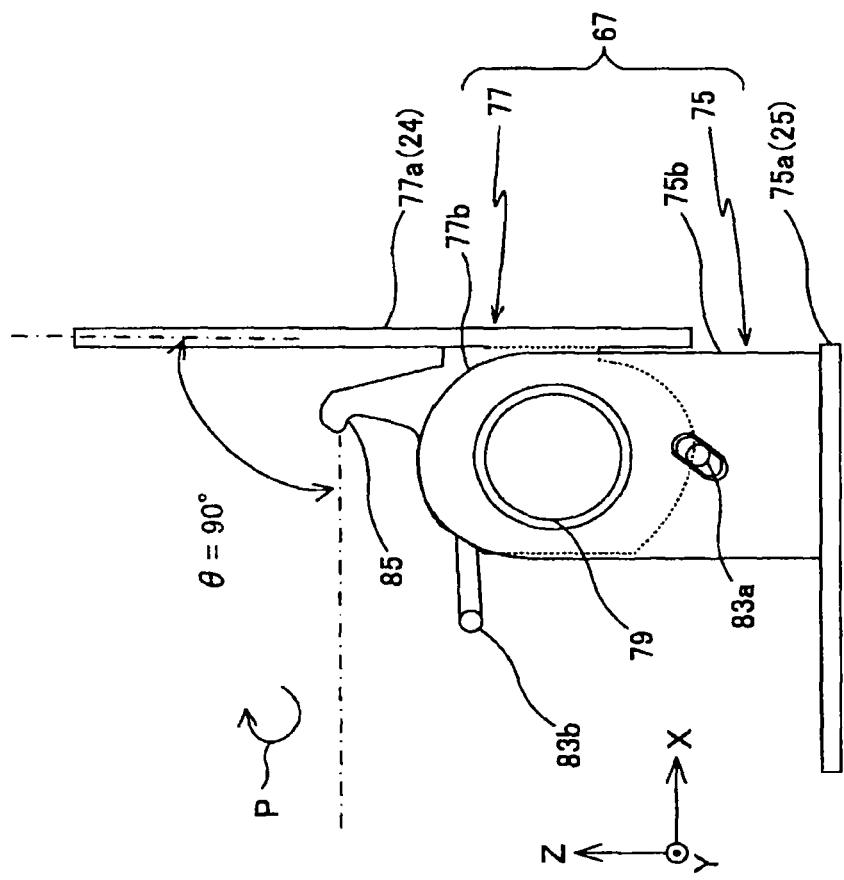

When an external moment against the retaining torque generated by the group of plate springs 88 is applied to the image input unit 24 from the condition shown in FIG. 14A, the fitting between the convex cam pair 93 and the second concave cam pair 97b is released, and the image input unit 24 and the convex cam pair 93 simultaneously rotate with respect to the enclosure 25 in the direction shown by the arrow P. When the image input unit 24 rotates for 45° from the condition shown in FIG. 14A (see FIG. 14C), the convex cam pair 93 rotates for 45° in the direction shown by the arrow P from the condition shown in FIG. 14B to be fitted with the third pair of concave cams are (see FIG. 14D). With this, the image input unit 24 is retained with a fixed condition with respect to the enclosure 25 so that the angle between its back surface with respect to the horizontal plane is 135° (see FIG. 14C).

When the external moment is removed when the image input unit 24 is rotated in the direction as shown by the arrow P for less than 45° with respect to the enclosure 25 from the condition as shown in FIG. 14A, the image input unit 24 is retained at the position as it is because the self-weight moment of the image input unit 24 is below the retaining torque generated by the group of plate springs 88.

Figure 14D:
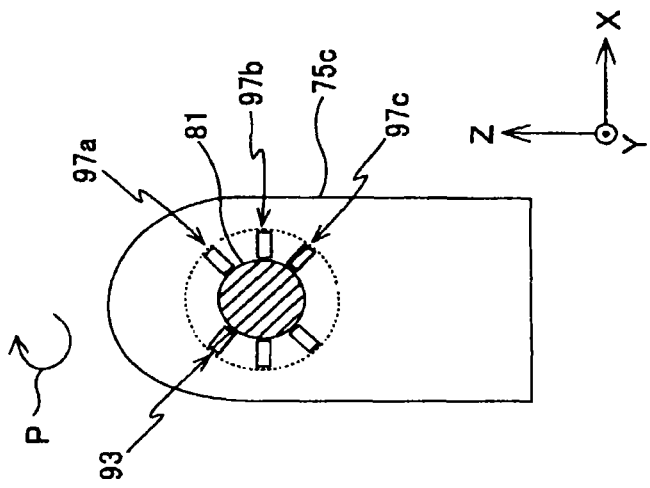
Figure 14C:
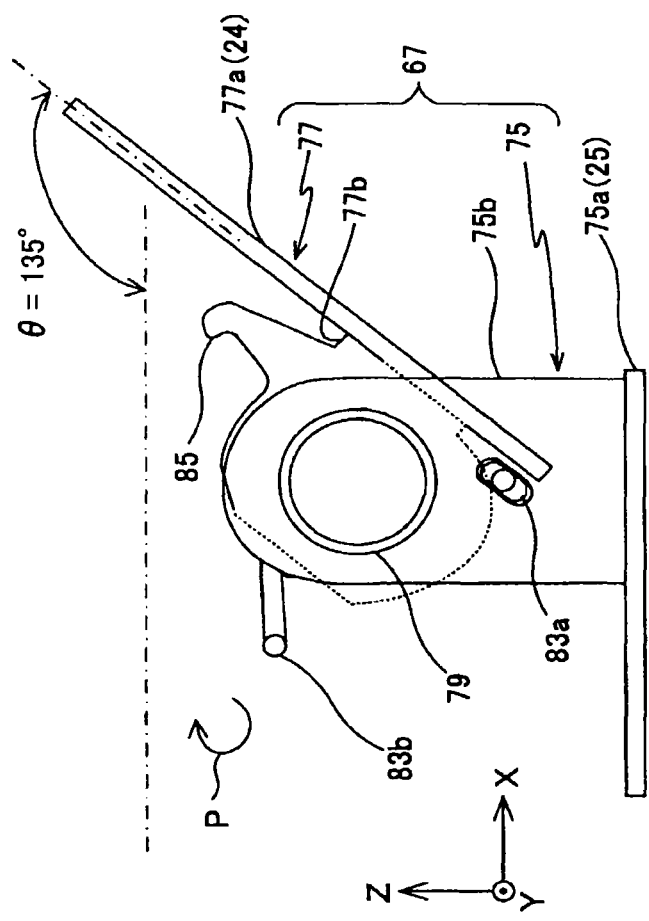

Further, by the operations opposite to those above are performed, the image input unit 24 rotates from the position shown in FIG. 14C to the positions respectively shown in FIG. 14A, FIG. 13E, FIG. 13C and FIG. 13A with respect to the enclosure 25 in this order, and simultaneously, the convex cam pair 93 rotates from the position shown in FIG. 14D to the positions respectively shown in FIG. 14B, FIG. 13F, FIG. 13D and FIG. 13B with respect to the second bearing unit 75c in this order.

Although not shown in the drawings, the convex cam 91 may have a tapered shape where a front edge (−Y side) is thinner than a base edge (+Y side) or a smooth front edge, and each of the concave cams 95a, 95b, and 95c are formed to have a tapered shape where a part at the −Y side is thinner than a part at the +Y side or a smooth opening so that the convex cam 91 can be fitted to and removed from each of the concave cams 95a, 95b and 95c smoothly.

As is understood from the above description, the convex cam pair 93 and the first, the second, and the third concave cam pairs 97a, 97b and 97c function as a cam device 99 that retains the image input unit 24 with respect to the enclosure 25 at a predetermined position around the first axial line. Further, before and after the fitting operations between the convex cams and the concave cams of the cam device 99, the magnitude of the retaining torque generated by the retaining torque generation device 88 varies. It means that as for the retaining torque generation device 88, the group of plate springs 88 is in a condition where it is compressed to a predetermined amount when the convex cams and the concave cams of the cam device 99 do not fit, a defined magnitude of the retaining torque is generated, while the plate springs 88 extend in the extending direction when the convex cams and the concave cams of the cam device 99 fit, the retaining torque becomes smaller compared with the case when the convex cams and the concave cams of the cam device 99 do not fit.

As described above, the uniaxial hinge device 67 has a pop-up function by which the image input unit 24 is quickly rotated (pop-up style) from the housing position to the protruding position and a position retaining function by which the image input unit 24 is retained at a desired position within a predetermined range or retained with a fixed condition at a predetermined position within the predetermined range around the first axial line with respect to the enclosure 25 in addition to the original function of connecting the image input unit 24 with respect to the enclosure 25 around the uniaxial hinge device 67.

Figure 8:
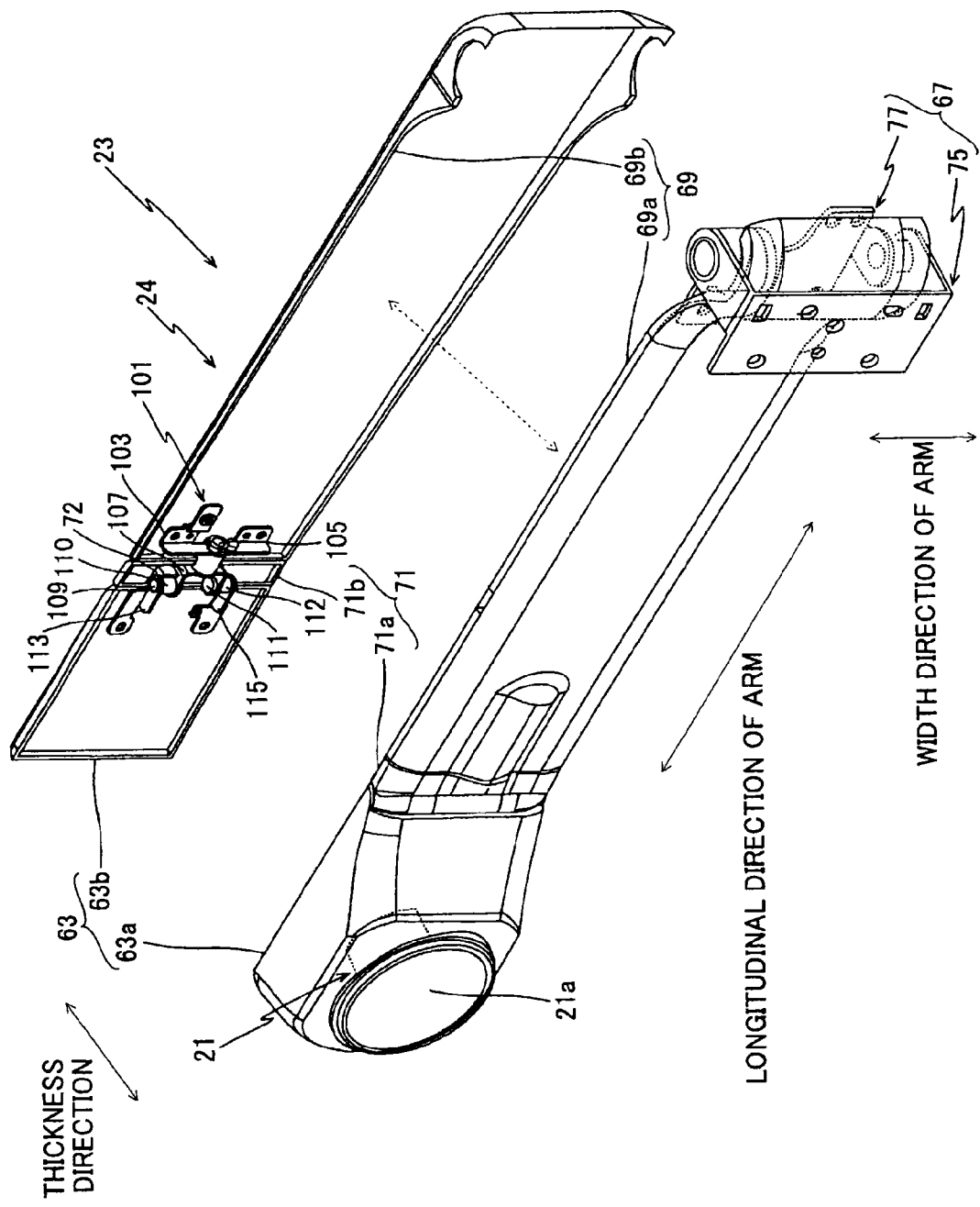
FIG. 8 is an exploded perspective view of the image input device.
Figure 15:
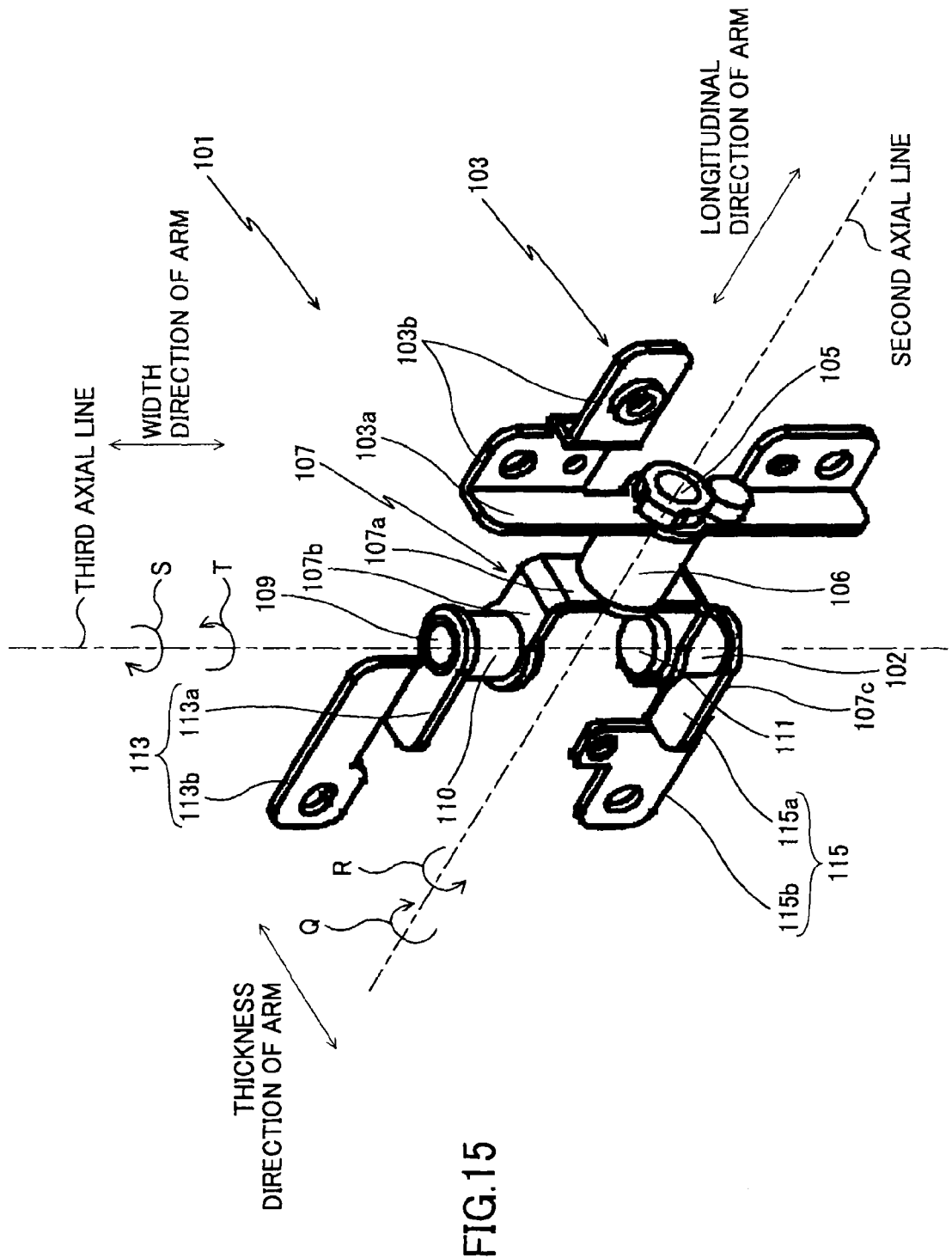
FIG. 15 is a perspective view of a biaxial hinge device of the image input unit.

FIG. 8 is an exploded perspective view of the image input device 23. FIG. 15 is a perspective view of a biaxial hinge device 101. The structure of the biaxial hinge device 101 will be explained. As shown in FIG. 8 and FIG. 15, the biaxial hinge device 101 includes a third hinge member 103, a fourth hinge member 107 connected to the third hinge member 103 via a third shaft member 105 that extends in a parallel relationship with the longitudinal direction of the arm 69, a fifth hinge member 113 and a sixth hinge member 115 connected to the fourth hinge member 107 via the fourth shaft member 109 and the fifth shaft member 111 which extend in parallel relationships with the width direction of the arm 69, respectively.

As shown in FIG. 8, the third hinge member 103 is fixed to the arm 69 while being housed in the edge of the arm 69. Concretely, as shown in FIG. 15, the third hinge member 103 includes a bearing unit 103a and plural of (for example, three) fixing units 103b. The bearing unit 103a is composed of a flat plate part whose longitudinal direction is same as the width direction of the arm 69 and whose thickness direction is same as the longitudinal direction. The bearing unit 103a rotatably retains one end of the third shaft member 105 at the middle part in its longitudinal direction. Each of the three fixing units 103b is composed of a flat plate part having its thickness direction same as the thickness direction of the arm 69. Each of the three fixing units 103b is directly or indirectly connected to the bearing unit 103a so that it becomes in a parallel relationship with the flat surface of the second arm member 69b (a part of the back surface of the image input unit 24). Each of the three fixing units 103b is fixed to the first arm member 69a or the second arm member 69b by a bolt or the like, although not shown in the drawings.

The third shaft member 105 is inserted in a cylindrical bearing member 106 and one end of which is rotatably connected to the third hinge member 103. An axis (rotational center) of the third shaft member 105 will be referred to as a second axial line. The second axial line extends in a parallel relationship with the longitudinal direction of the arm 69 and the first axial line extends in a parallel relationship with the width direction of the arm 69. It means that the projections of the first and the second axial lines on a predetermined plane (virtual plane) are orthogonal to each other.

As shown in FIG. 5, the bearing member 106 is inserted through an opening 69c formed at a front edge part of the arm 69 and an opening 71c formed at an edge part of the cover unit 71 side by side with the arm 69.

As shown in FIG. 8, the fourth hinge member 107 is housed in the cover unit 71. Concretely, as shown in FIG. 15, the fourth hinge member 107 includes a shaft fixing unit 107a, and bearing units 107b and 107c. The shaft fixing unit 107a is composed of a flat plate part that is orthogonal to the second axial line, and the other end of the third shaft member 105 is fixed at it middle part. The bearing unit 107b is composed of a flat plate part orthogonally connected to one end of the shaft fixing unit 107a, and rotatably retains one edge of the fourth shaft member 109. The bearing unit 107c is composed of a flat plate part connected to the other edge of the shaft fixing unit 107a, and rotatably retains one end of the fifth shaft member 111.

The fourth shaft member 109 is inserted through the cylindrical bearing member 110, one edge of which is rotatably connected to the fourth hinge member 107 as described above, and the other edge of which is fixed at the fifth hinge member 113.

The fifth shaft member 111 is inserted through the cylindrical bearing member 112 coaxially with the fourth shaft member 109, one edge of which is rotatably supported by the fourth hinge member 107 as explained above, and the other edge of which is fixed to the sixth hinge member 115. Hereinafter, the axis (rotational center) of the fourth shaft member 109 and the fifth shaft member 111 will be referred to as a third axial line. Further, the second axial line is in a parallel relationship with the longitudinal direction of the arm 69, and the third axial line is in a parallel relationship with the width direction of the arm 69. It means that the projected images of the second and the third axial lines on a predetermined plane (a virtual plane) are orthogonal with each other.

As shown in FIG. 8, the bearing member 110 and the bearing member 112 are supported by the respective support units 72 provided in the first cover member 71a and the second cover member 71b from both sides of the width direction of the cover units 71. As for simplifying the drawings, only the support units provided in the second cover member 71*b* are shown in FIG. 8.

As shown in FIG. 15, the fifth hinge member 113 includes a shaft fixing unit 113*a* and a fixing unit 113*b*. The shaft fixing unit 113*a* is composed of a flat plate part orthogonal to the third axial line and the fourth shaft member 109 is connected to one edge part thereof. The shaft fixing unit 113*a* is inserted through slit holes (not shown in the drawings) formed respectively at side by side edges of the cover unit 71 and the camera housing unit 63 and the other edge part is housed in the camera housing unit 63 (see FIG. 8). The fixing unit 113*b* is composed of a flat plate part orthogonally continued as the shaft fixing unit 113*a*, and is in a parallel relationship with the flat surface of the second housing member 63*b* (a part of the back surface of the image input unit 24). Although not shown in the drawings, the fixing unit 113*b* is fixed to the second housing member 63*b* by a bolt or the like.

The sixth hinge member 115 includes a shaft fixing unit 115*a* and a fixing unit 115*b*. The shaft fixing unit 115*a* is composed of a flat plate part orthogonal to the third axial line and the fifth shaft member 111 is fixed to one edge part thereof. The shaft fixing unit 115*a* is inserted through slit holes (not shown in the drawings) formed respectively at side by side edges of the cover unit 71 and the camera housing unit 63 and the other edge part is housed in the camera housing unit 63 (see FIG. 8). The fixing unit 115*b* is composed of a flat plate part orthogonally continued as the shaft fixing unit 115*a*, and is in a parallel relationship with the flat surface of the second housing member 63*b* (a part of the back surface of the image input unit 24). Although not shown in the drawings, the fixing unit 115*b* is fixed to the second housing member 63*b* by a bolt or the like.

As for the biaxial hinge device 101 shown in FIG. 15, the fixing units 103*b*, 113*b*, and 115*b* of the third, the fifth and the sixth hinge members 103, 113, and 115 are in parallel with each other and this condition will be referred to as a standard condition of the biaxial hinge device 101. When the biaxial hinge device 101 is in the standard condition, the flat surfaces of the second arm member 69*b*, the second cover member 71*b* and the second housing member 63*b* are in a same plane to form the back surface of the image input unit 24 (see FIG. 5 and FIG. 12).

The rotation range of the fourth hinge member 107 around the second axial line with respect to the third hinge member 103 from the position shown in FIG. 15 is limited to a range between 180° in the direction shown as the arrow Q and 90° in the direction shown as the arrow Q by the function of the stopper device, not shown in the drawings, having a similar structure as the stopper device 82 of the uniaxial hinge device 67.

The fourth hinge member 107 is retained at a desired position within the above limited range around the second axial line by the function of a retaining torque generation device (not shown in the drawings) having a similar structure as the retaining torque generation device 88 of the uniaxial hinge device 67.

Further, the fourth hinge member 107 is retained with a fixed condition at plural positions with respect to the third hinge member 103 within the above limited range around the second axial line by the function of a cam device (not shown in the drawings) having a similar structure as the cam device 99 of the uniaxial hinge device 67. Concretely, the fourth hinge member 107 may be retained with a fixed condition at a first position shown in FIG. 15, a second position rotated for 90° in the direction shown as the arrow Q from the first position, a third position rotated for 180° in the direction shown as the arrow Q from the first position, and a fourth position rotated for 90° in the direction shown as the arrow R from the first position.

The rotation range of the fifth hinge member 113 and the sixth hinge member 115 around the third axial line with respect to the fourth hinge member 107 from the position shown in FIG. 15 is limited to a range between 45° in the direction shown as the arrow S and 45° in the direction shown as the arrow T by the function of a stopper device (not shown in the drawings) having a structure similar to that of the stopper device 82 of the uniaxial hinge device 67.

Further, the fifth hinge member 113 and the sixth hinge member 115 are respectively retained at a desired position within the above limited rotation range around the third axial line by the function of retaining torque generation devices (not shown in the drawings), respectively, having similar structures as the retaining torque generation device 88 of the uniaxial hinge device 67.

Further, the fifth hinge member 113 and the sixth hinge member 115 are respectively retained with a fixed condition at plural positions with respect to the fourth hinge member 107 within the above limited range around the third axial line by the function of a cam device (not shown in the drawings), having similar structures as the cam device 99 of the uniaxial hinge device 67.

Concretely, the fifth hinge member 113 and the sixth hinge member 115 may be retained with a fixed condition at a first position shown in FIG. 15, a second position rotated 45° in the direction shown as the arrow S from the first position, and a third position rotated 45° in the direction shown as the arrow T from the first position.

As is understood from the above explanation, the camera housing unit 63 housing the electronic camera 21 is independently rotatable around the second axial line and the third axial line with respect to the arm 69.

The biaxial hinge device 101 has a position retaining function of retaining the electronic camera 21 at a desired position or retaining the electronic camera 21 at a predetermined position with a fixed condition within a predetermined range around the second and the third axial lines, respectively, with respect to the arm 69 in addition to an original function of rotating the electronic camera 21 in two axis directions with respect to the arm 69.

Figure 16A:
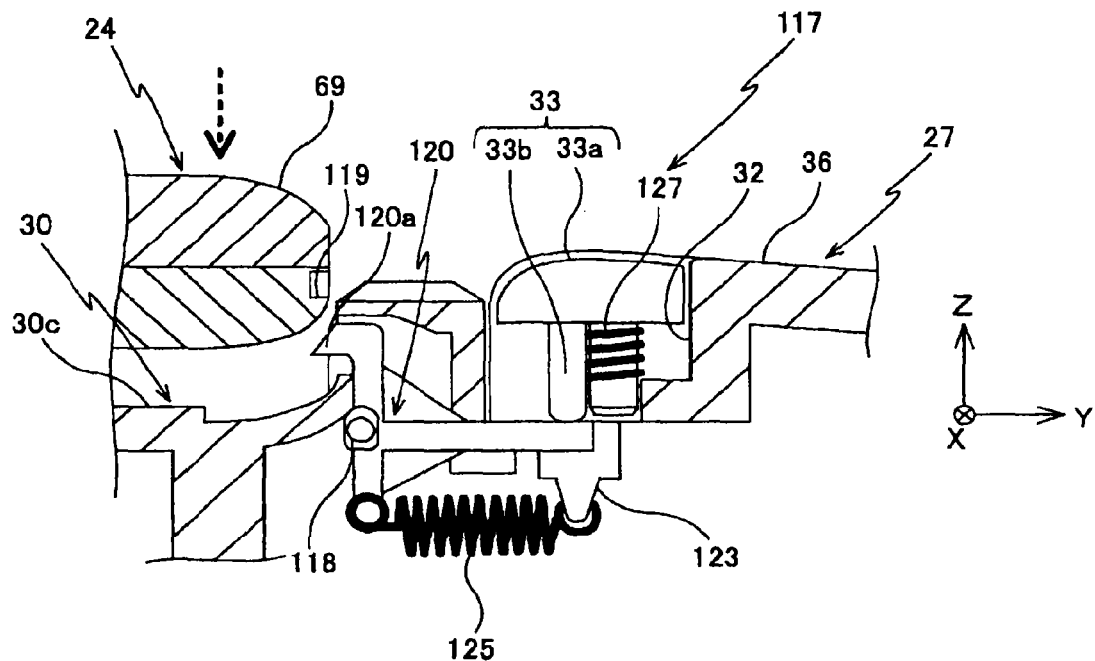
FIG. 16A to FIG. 16C are views for explaining the structure and the operation of a locking device of the video conference apparatus.
Figure 16B:
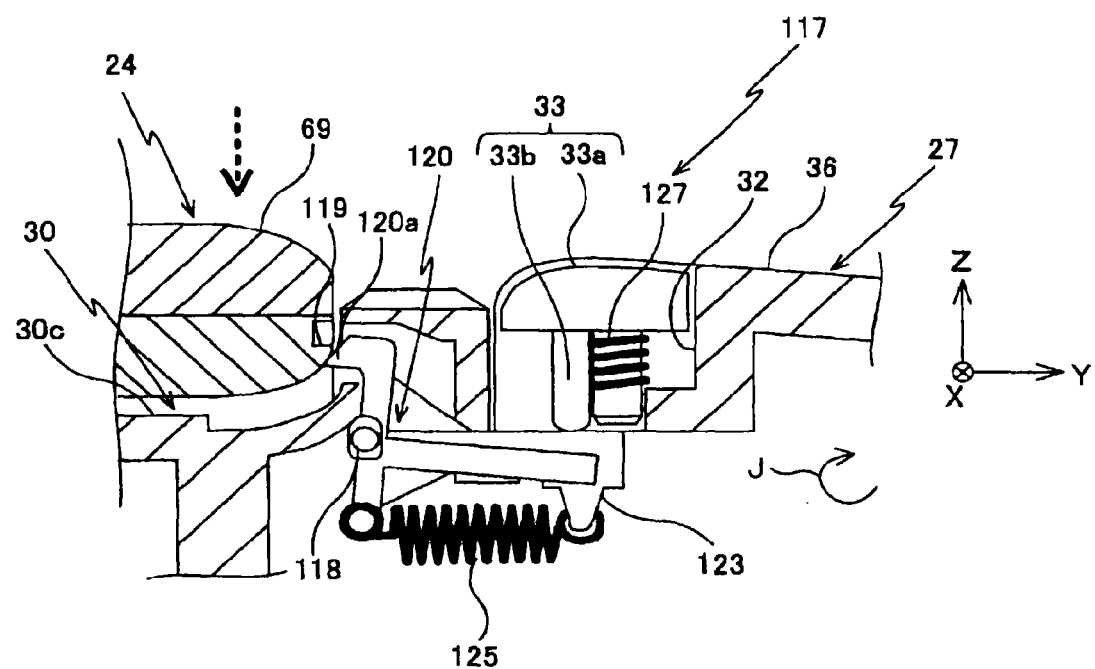

The structure of the locking device 117 will be explained with reference to FIG. 16A to FIG. 17B. As shown in FIG. 16A, the locking device 117 includes a locking member 120 (a locking mechanism), an engage concavity 119 that engages the locking member 120, and an unlock button 33 (an unlock mechanism) for releasing the engagement between the locking member 120 and the engage concavity 119.

When seen from the −X side, the locking member 120 has almost a same shape as "T" lying down where the part extending in the lateral direction is positioned at the +Y side of the part extending in the vertical direction. The crossing part of "T" shape of the locking member 120 is rotatably supported by the shaft 118 which is extending in the X-axis direction and supported by the upper cover 27 at a position between the shallow concavity 30*c* and the unlock button 33 in the Y-axis direction.

The locking member 120 includes an engage hook 120*a* protruding from its upper edge part to the −Y side. The engage hook 120*a* is inclined so that the edge surface at the −Y side becomes lower than that at the +Y side. The lower edge part of the locking member 120 is connected to a tension coil spring 125, and one edge of the locking member 120 is fixed to a rib 123 protruding downward from the flat part of the upper cover 27 at its other edge.

The tension coil spring 125 has its original length at the condition shown in FIG. 16A, and the engage hook 120a protrudes above the shallow concavity 30c (within the rotation range of the arm 69). Hereinafter, the position of the locking member 120 shown in FIG. 16A will be referred to as an initial position of the locking member 120.

The engage concavity 119 is a concavity formed at a side surface of the arm 69 at the +Y side, and has a size capable of accepting the front edge of the engage hook 120a (an edge at the −Y side). The engage concavity 119 is formed at a position capable of accepting the engage hook 120a to be inserted inside when the image input unit 24 is at the housing position (see FIG. 16C). Further, the lower surface defining the engage concavity 119 is positioned at a same height as the lower surface of the engage hook 120a when the image input unit 24 is at the housing position (see FIG. 16C).

The unlock button 33 is inserted in a notch 32 formed at an edge of the flat part 36 at the −Y side to be movable in the upper and lower directions and has a pushed part 33a having a substantially flat plate shape in a parallel relationship with an XY plane, and an extending part 33b extending downward from the lower edge of the pushed part 33a. The pushed part 33a is urged upward with respect to the upper cover 27 by a compression coil spring 127, and its upper surface is at almost a same surface as that of the flat part 36. The lower edge of the extending part 33b contacts the upper surface of the edge at the +Y side of the locking member 120. The position of the unlock button 33 as shown in FIG. 16A will be referred to as an initial position.

The operation of the locking device 117 will be explained. First, as shown in FIG. 16A, when the image input unit 24 is at the protruding position, the engage hook 120a protrudes above the shallow concavity 30c. Then, by rotating the image input unit 24 from the protruding position to the housing position, the arm 69 touches an inclined surface of the engage hook 120a to push the engage hook 120a toward the +Y side against the resilient force of the tension coil spring 125. With this force, the locking member 120 rotates in the direction shown by an arrow J around the shaft 118 (see FIG. 16B). Then, when the image input unit 24 moves to the housing position where the bottom surface defining the engage concavity 119 faces the engage hook 120a. At this time, the locking member 120 rotates in the opposite direction of the direction shown by the arrow J by the function of the tension coil spring 125 (recovery of the resilient force) so that the engage hook 120a is inserted in the engage concavity 119 (see FIG. 16C). At this time, the lower surface of the engage hook 120a and the lower surface defining the engage concavity 119 contact each other. By this, the image input unit 24 is held at the housing position (in the joggle concavity 30). It means that the rotation of the image input unit 24 from the housing position to the protruding position is locked.

Figure 16C:
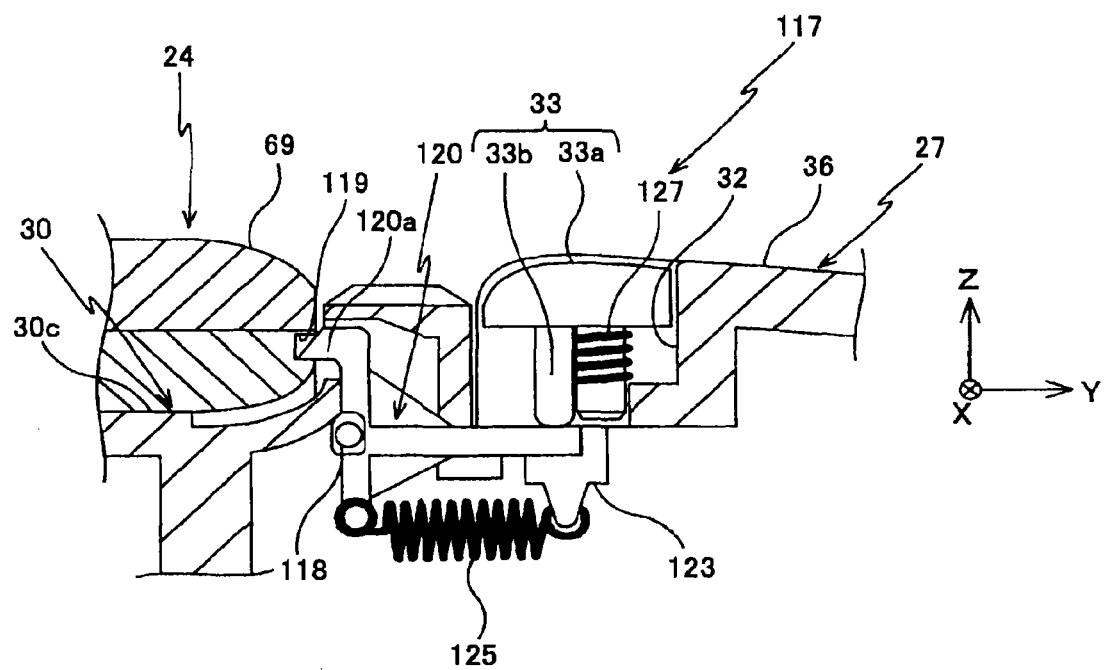
Figure 17A:
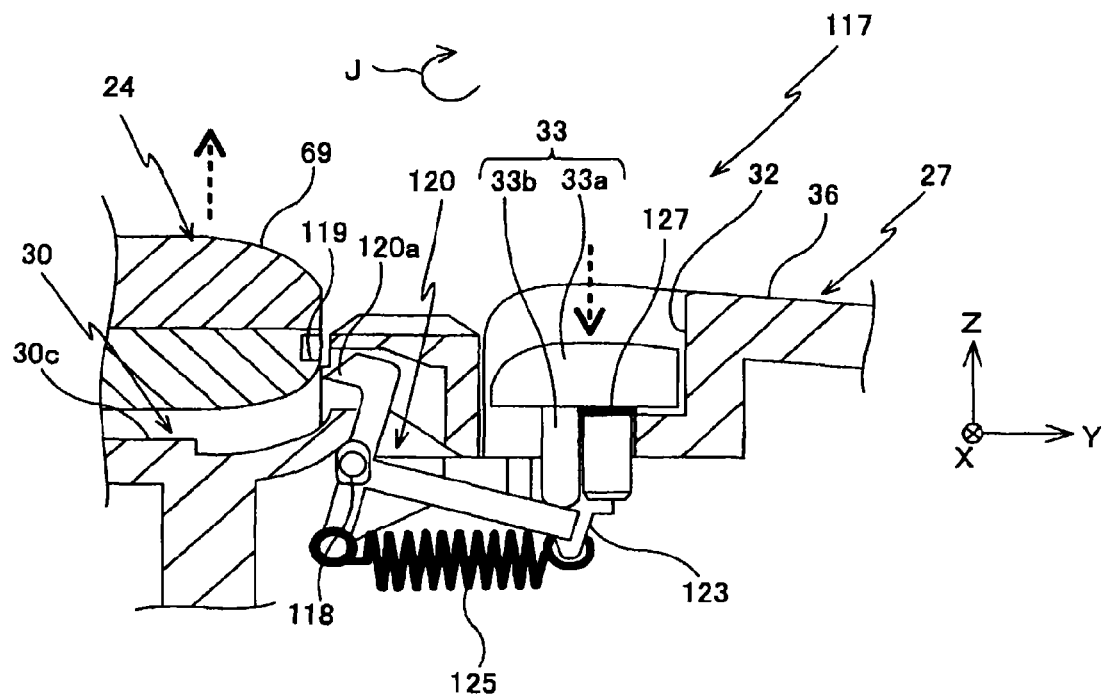
FIG. 17A and FIG. 17B are views for explaining the structure and the operation of the locking device of the video conference apparatus.
Figure 17B:
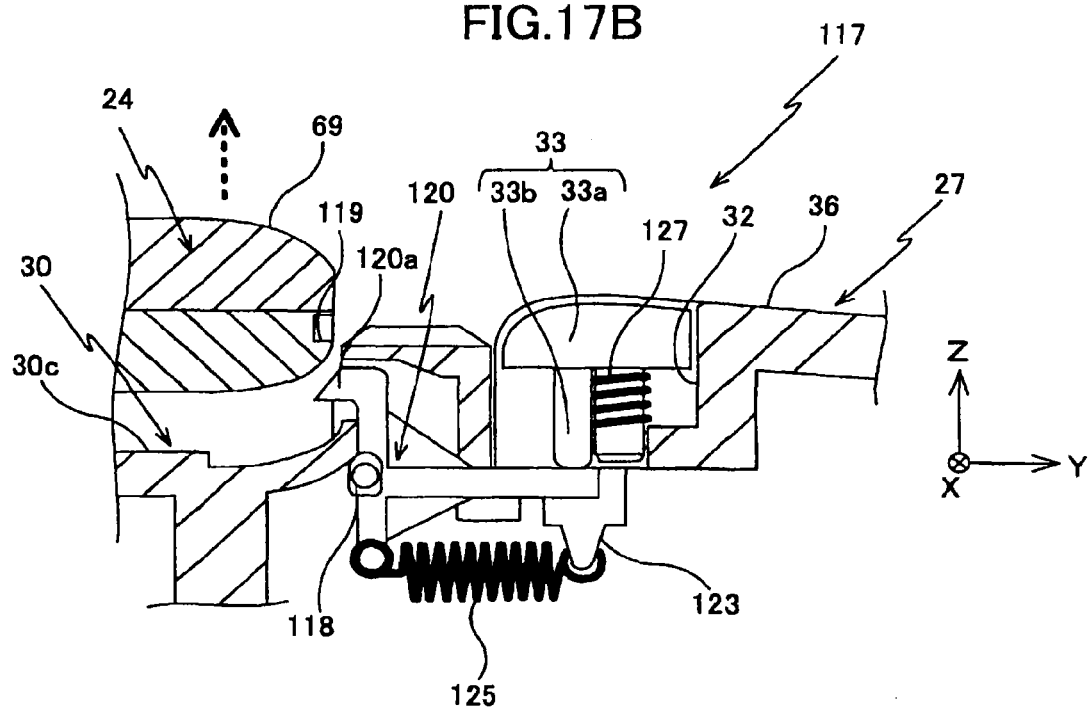
Figure 18:
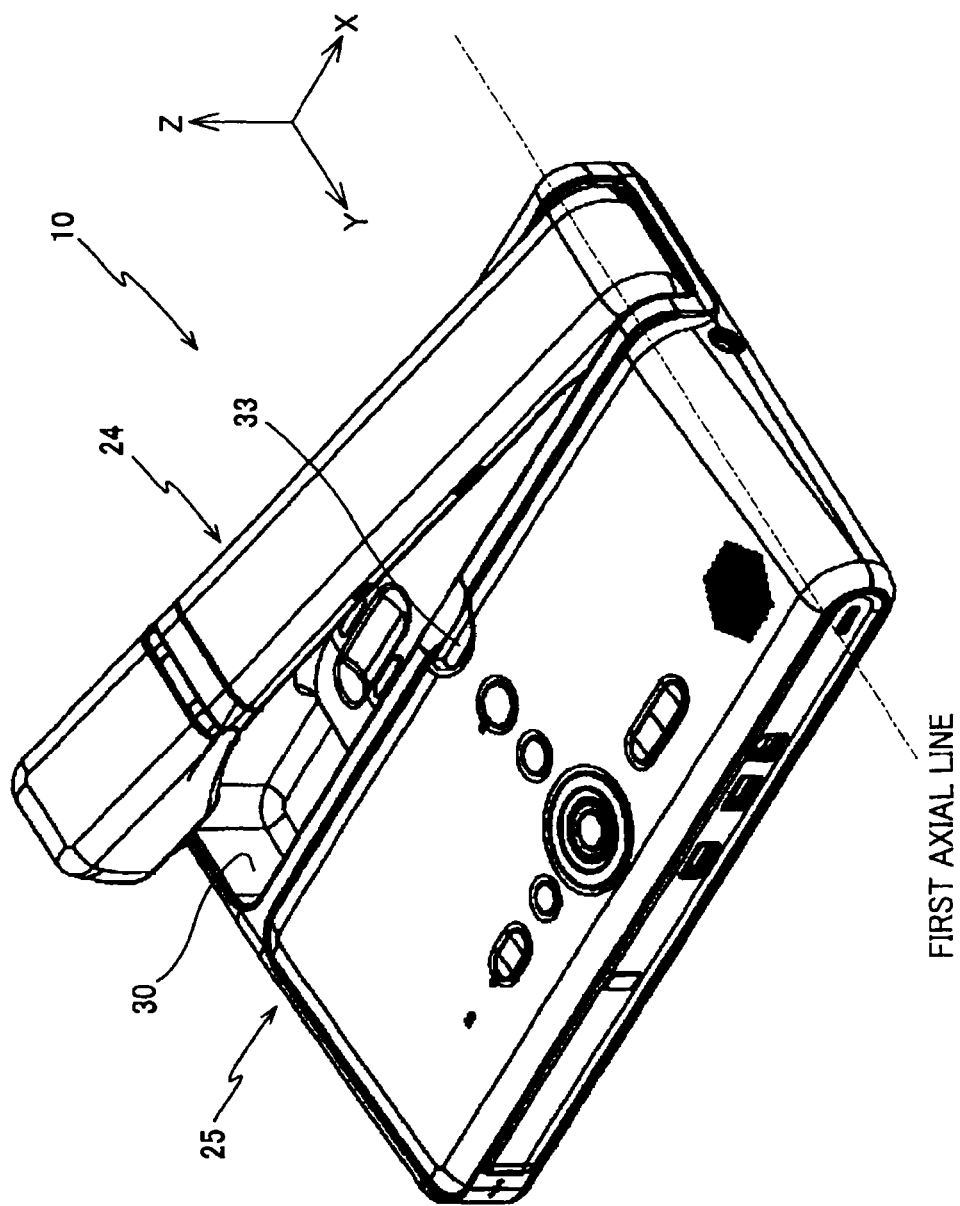
FIG. 18 is a view for explaining the operation of the image input unit.
Figure 19:
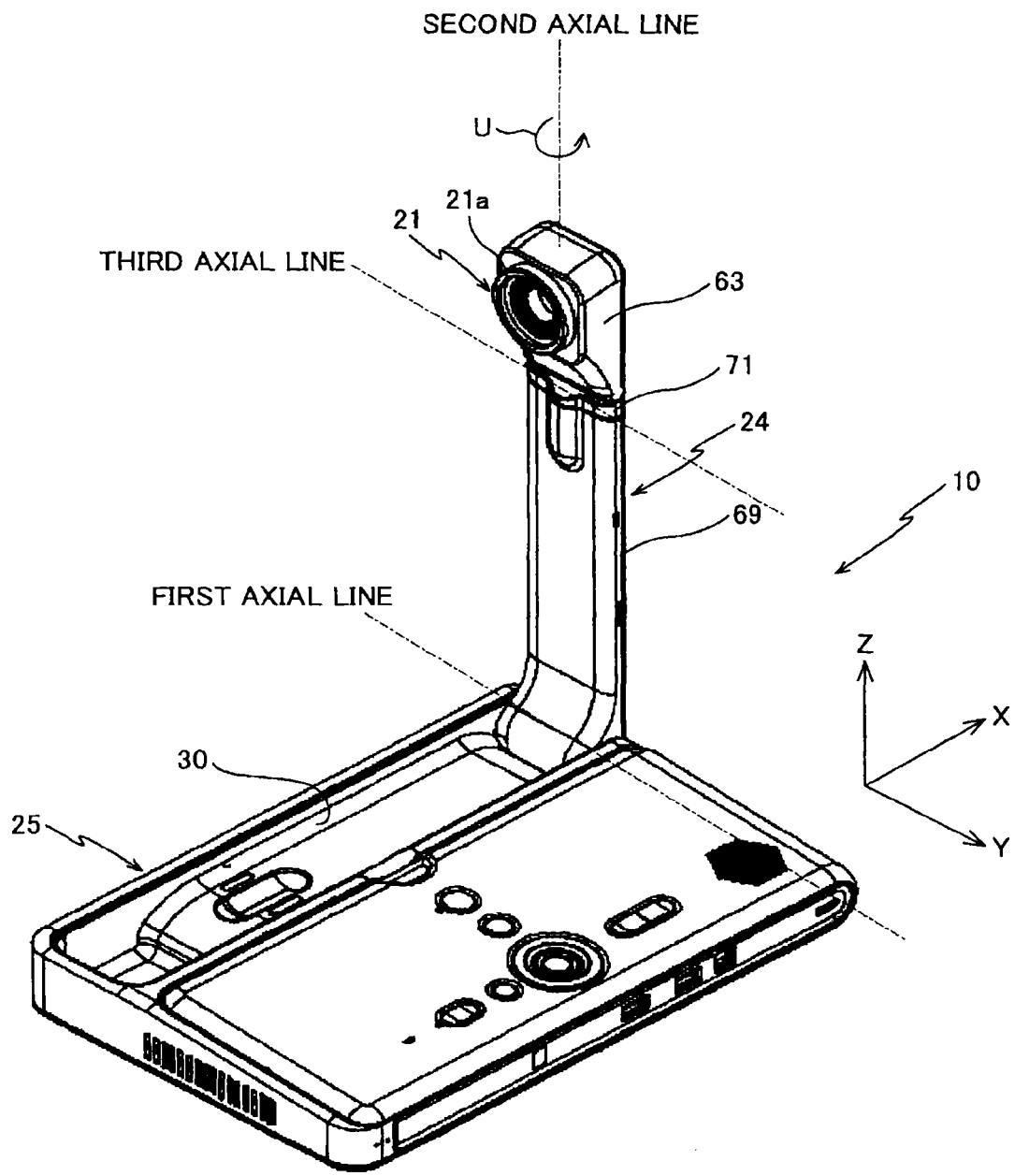
FIG. 19 is a view for explaining the operation of the image input unit.
Figure 20:
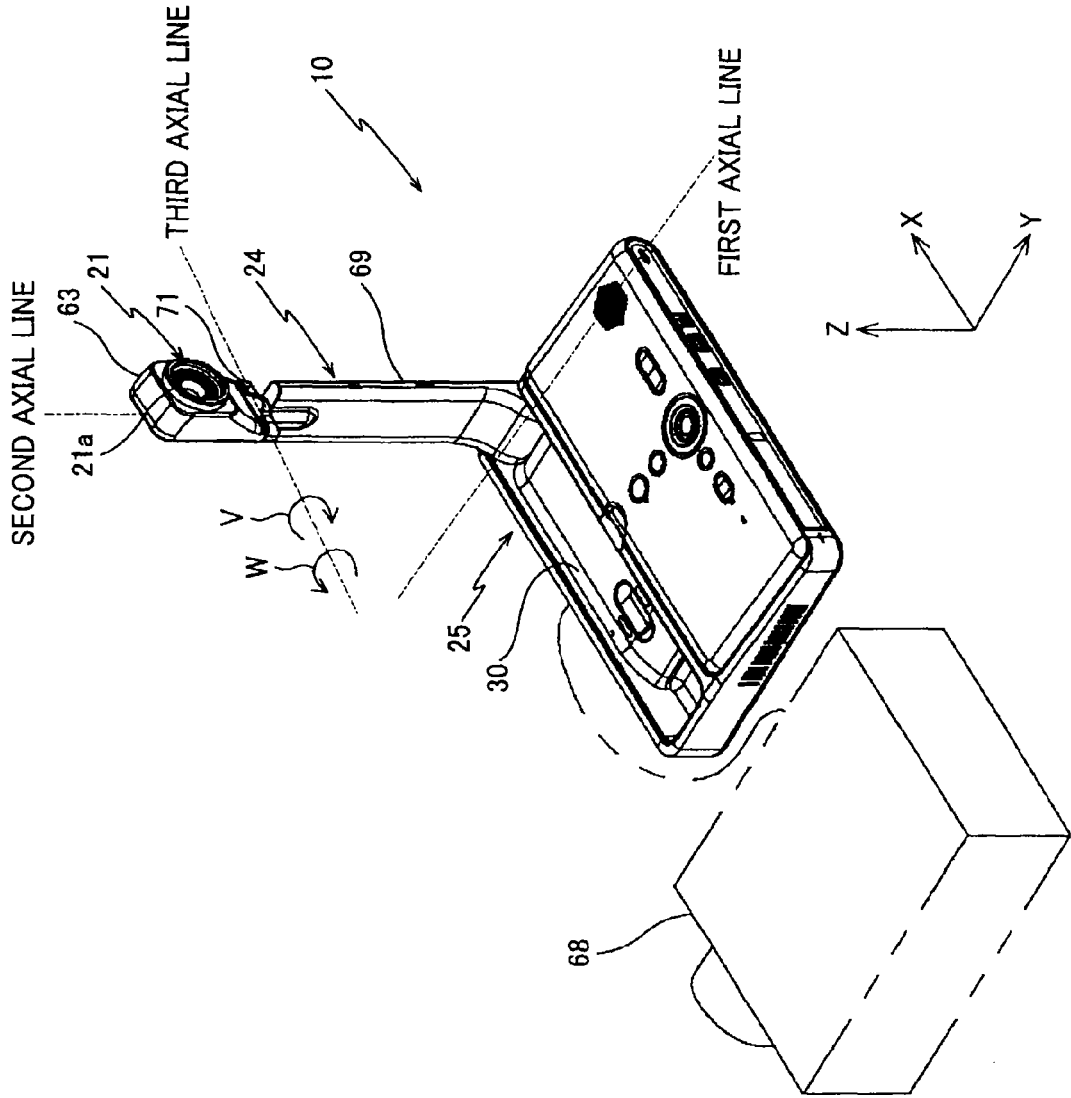
FIG. 20 is a view for explaining the operation of the image input unit.

On the other hand, when the image input unit 24 is hold at the housing position as shown in FIG. 16C, by pushing the unlock button 33 (the pushed part 33a) downward against the resilient forces of the compression coil spring 127 and the tension coil spring 125 as shown in FIG. 17A, the locking member 120 rotates in the direction shown by the arrow J around the shaft 118 because of leverage to remove the engage hook 120a from the engage concavity 119. With this operation, the image input unit 24 is released from the housing position and by the force of the helical torsion spring 83, rotated toward the protruding position. When the pushing of the unlock button 33 downward is released, the locking member 120 and the unlock button 33 move back to their initial positions by the force of the compression coil spring 127 and the tension coil spring 125 (see FIG. 17B).

As can be understood from the above description, the locking device 117 has both a lock function and an unlock function of the image input unit 24 housed in the joggle concavity 30.

An example of a method of using the video conference apparatus 10 will be explained, where the operations of the thus structured video conference apparatus 10 will be mainly explained. A user may sit at the +Y side of the video conference apparatus 10 that is placed horizontally, for example on a desk or the like (see FIG. 3). It is assumed that lines for electricity or communications for the video conference apparatus 10 are previously prepared. For the video conference apparatus 10, initially, the image input unit 24 is housed in the enclosure 25 (see FIG. 1 and FIG. 2). The projector device 68 for displaying the image sent from an external video conference apparatus of the other party is connected to the video conference apparatus 10 (see FIG. 20).

First, the user pushes down the unlock button 33 to unlock the lock of the image input unit 24 to the enclosure 25. At this time, by the pop-up feature of the uniaxial hinge device 67, the image input unit 24 rotates (pop-ups) with respect to the enclosure 25 around the first axial line, and protrudes from the enclosure 25 by a predetermined amount (see FIG. 18).

At this time, the user may grasp the image input unit 24 by his/her hand and rotate it around the first axial line by himself/herself to have the electronic camera 21 positioned at a desired height. Then, when the total rotational angle of the image input unit 24 becomes 45°, the user feels a click due to the function of the cam device 99 (the engagement between the convex cams and the concave cams). When the user further rotates the image input unit 24 around the first axial line, and when the total rotation angle becomes 90°, the user again feels a click due to the function of the cam device 99. At this time, the user may stop rotating the image input unit 24 around the first axial line. The image input unit 24 is retained in a fixed condition at this position by the cam device 99 (see FIG. 19).

The user then rotates the camera housing unit 63 in one direction (the direction shown by the arrow U in FIG. 19) around the second axial line with respect to the arm 69 to have the angle of the taking lens 21a of the electronic camera 21 around the second axial line meet his/her face. When the total rotation angle of the camera housing unit 63 becomes 90°, the user feels a click by the function of the cam device 99. Then, the user stops the rotation of the camera housing unit 63 around the second axial line (see FIG. 20). The camera housing unit 63 is retained with a fixed condition at this position by the above-described cam device 99. In this case, it is assumed that the angle of the taking lens 21a around the second axial line meets the user's face at this position. Further, the electronic camera 21 is rotatable from the condition shown in FIG. 19 (where the rotation angle around the second axial line is 0°) for 180° in the direction shown by the arrow U in FIG. 19 and for 90° in a direction opposite to the direction shown by the arrow U in FIG. 19 by the function of the above-described stopper device and capable of being retained at a desired position within the rotational range by the function of the above-described retaining torque generation device 88. The electronic camera 21 may retained with a fixed condition at each of the rotation angles +0°, +90°, +180° and −90° (where the direction shown by the arrow U is defined as +direction) and the user can feel clicks at the respective positions by the function of above-described cam device 99.

When the height of the electronic camera 21 does not meet the user's face, the user may rotate the camera housing unit 63 in one direction (the direction shown by the arrow V in FIG. 20) or the other direction (the direction shown by the arrow W in FIG. 20) around third axial line with respect to the arm 69. Then, the user stops the rotation of the taking lens 21a around the third axial line when the angle meets the user's face. The camera housing unit 63 is retained at this position around the third axial line by the function of the above-described retaining torque generation device 88. The camera housing unit 63 is rotatable from the condition shown in FIG. 20 (where the rotation angle around the third axial line is 0°) for 45° in the directions shown by the arrows V and W respectively by the function of the above-described stopper device and capable of being retained with a fixed condition at positions including 0°, rotated for 45° in the direction shown by the arrow V, and rotated for 45° in the direction shown by the arrow W, by the function of above-described cam device 99. Thus, user can feel clicks at the respective positions.

With the above operations, it is possible to have the taking lens 21a of the electronic camera 21 face the user's face.

However, the operations for rotating or moving the electronic camera 21 are not so limited to the above-described operations. In any case, the image input unit 24 may be retained at a desired position by rotating around the first axial line with respect to the enclosure 25 in the range 45° to 135°, and if necessary, by rotating the camera housing unit 63 around at least one of the second and the third axial lines with respect to the arm 69 for a certain angle in accordance with the user's sitting position or the height of the user's face.

In this case, the image input unit 24 may be rotated from the housing position 135° around the first axial line with respect to the enclosure 25 and the camera housing unit 63 may be rotated 45° in one direction around the third axial line (the direction shown by the arrow I in FIG. 21) with respect to the arm 69.

Figure 21:
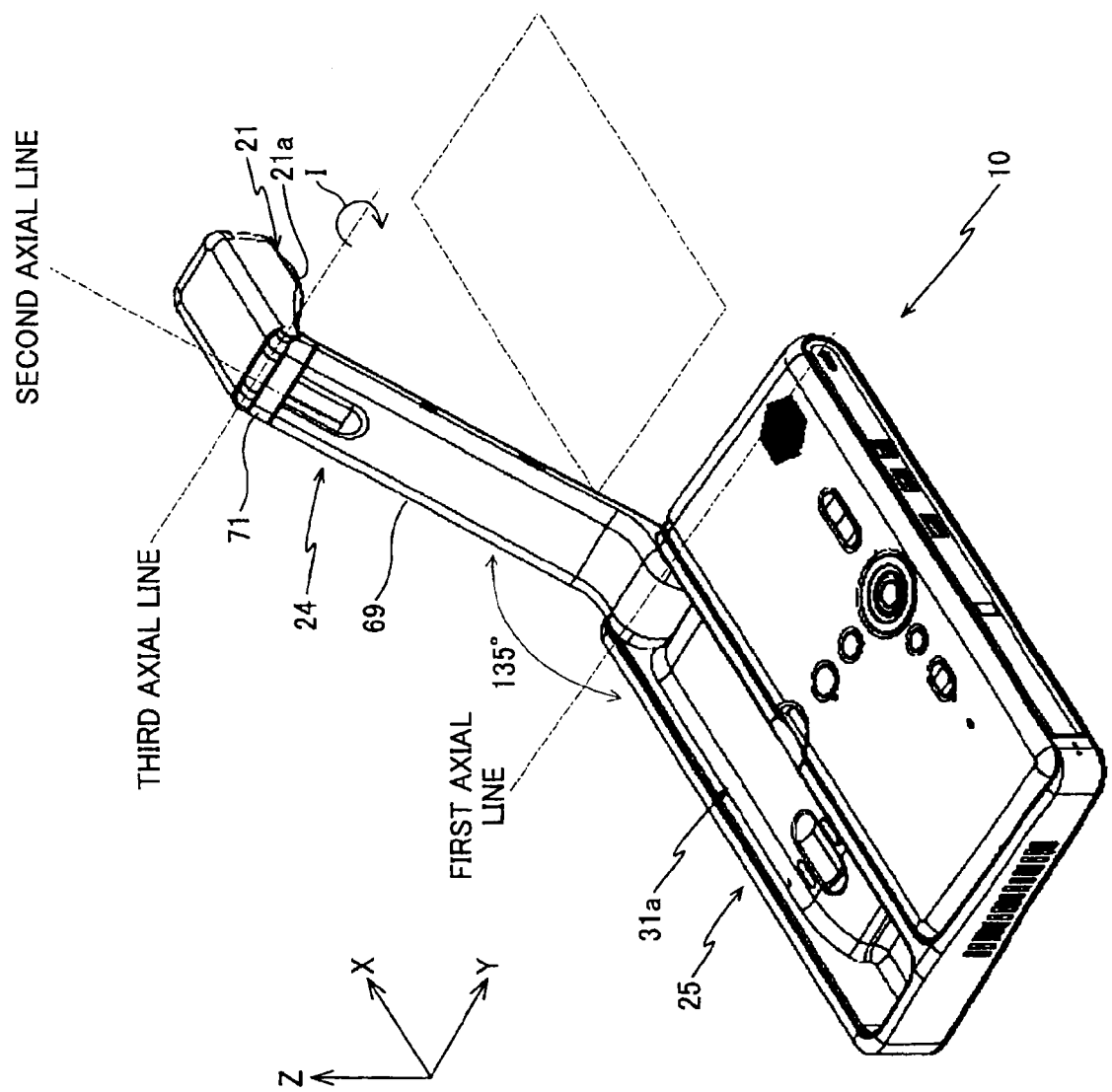
FIG. 21 is a view for explaining the operation of the image input unit.

With this operation, as shown in FIG. 21, the electronic camera 21 is retained with the taking lens 21a facing downward at the +X side of the enclosure 25, and an image of a document or the like placed at the +X side of the enclosure 25 can be input. Therefore, the video conference apparatus 10 can send the image data to the video conference apparatus of the other party.

Then, the user pushes the power button 35 (see FIG. 3) to initiate the video conference apparatus 10. Then, the user pushes the line button 37 (see FIG. 3) to communication with the party's video conference apparatus via an INTERNET line.

Then, the image data sent from the video conference apparatus of the other party is data processed by the video conference apparatus 10 and the image data is displayed on a screen by the projector device 68 in an enlarged condition. Further, the voice data sent from the video conference apparatus of the other party is data processed by the video conference apparatus 10 and the voice audio is output. The video conference apparatus 10 inputs images such as a user's face and the image data is processed and then sent to the video conference apparatus of the other party. The video conference apparatus 10 also inputs voice data of the user and the voice data is processed to be sent to the video conference apparatus of the other party. With this two-way communication of image and voice data, the video conference is performed.

The user may appropriately push the volume control buttons 41a and 41b to adjust the volume of the sound output from the speaker 15a or may push the microphone mute button 47 not to output the user's voice to the opposite party, before the video conference starts or during the video conference.

Further, the user may appropriately push the menu button 45 to read out a menu image plane on the screen, then push the cursor 40 to select the desired item on the menu image plane, and push the selection button 39 to execute the desired item (function).

After the video conference ends, the user may push the line button 37 to disconnect the INTERNET line, and push the power button 35 to terminate the power supply to the video conference apparatus 10. Then, the user may rotate the camera housing unit 63 with respect to the arm 69 around at least one of the second or the third axis lines if necessary to have the image input unit 24 return to the standard condition, and then may rotate the image input unit 24 at the standard condition around the first axial line to be housed in the joggle concavity 30. When the image input unit 24 is housed in the joggle concavity 30, it is locked by the locking device 117 to be locked in the enclosure 25. In this condition, the video conference apparatus 10 has a substantially flat plate shape condition with A4 size in a plan view.

The above-described method of using the video conference apparatus 10 may be adapted for the case when a monitor or the like, for example, is connected to the monitor device of the video conference apparatus 10 instead of the projector device 68.

As described above, according to the embodiment of the video conference apparatus 10, the image input unit 24 is rotatably connected to the enclosure 25 via the uniaxial hinge device 67 whose axis direction is the first axial line extending in the enclosure 25 so that the image input unit 24 is rotatable between the housing position where the image input unit 24 is housed in the joggle concavity 30 and the protruding position where the image input unit 24 protrudes from the joggle concavity 30. Therefore, by just rotating the image input unit 24 with respect to the enclosure 25 around the first axial line, the image input unit 24 can be moved from the housing position to the protruding position, or the opposite way from the protruding position to the housing position. It means that the electronic camera 21 is easily moved from inside the enclosure 25 to the position where the electronic camera 21 can take pictures of an object, or the opposite way where the electronic camera 21 is easily moved from the position where the electronic camera 21 can take pictures of the object to inside the enclosure 25. Therefore, the video conference apparatus 10 can capture the object within a photographing field with high portability.

Further, conventionally, as for a video conference apparatus, the electronic camera is connected to the enclosure via an arm having a multi-axial hinge device of two or more axial or a multiarticular arm for having the electronic camera face an object easily. As for the video conference apparatus 10, the arm 69 is connected to the enclosure 25 via the uniaxial hinge device 67 housed in the enclosure 25 at one edge in the longitudinal direction thereof while having the electronic camera 21 rotatably connected at another edge in the longitudinal direction around two axes. Therefore, the size of the hinge device can be reduced compared with a case when the arm is connected with the enclosure via the multi-axial hinge device so that a space necessary for receiving the hinge device can be reduced and as the uniaxial hinge device 67 rotates around only one axis, a space necessary for the hinge device to rotate within the enclosure can be reduced as well. With this, the enclosure can be smaller and thinner.

When the image input unit 24 takes the housing position, a part is placed on the bottom surface defining the joggle concavity 31 while the rotation from the housing position to the protruding position is prevented by the function of the locking device 117. Therefore, when carrying the video conference apparatus 10, the image input unit 24 is prevented from protruding from the enclosure 25, and the bumping of the image input unit 24 with respect to the enclosure 25 in the rotation direction can be prevented.

The image input unit 24 is retained at the housing position to have the flat back surface position the same height as that of the upper surface of the enclosure 25; therefore, the video conference apparatus 10 has a very good appearance when seen from the side.

When the image input unit 24 takes the housing position, the image input unit 24 is almost embedded in the enclosure 25 in a plan view. Therefore, the video conference apparatus 10 has uniformity as a whole and has a very good appearance in a plan view. Further, when carrying the video conference apparatus 10, the bumping of the image input unit 24 along the upper surface of the enclosure can be prevented.

By just pushing the unlock button 33 to unlock the prevention of the rotation of the image input unit 24 from the housing position to the protruding position by the function of the locking device 117, by the pop-up function of the uniaxial hinge device 67, the image input unit 24 can be moved to the predetermined protruding position. With this, the user can grasp the image input unit 24, and move the image input unit 24 around the first axial line with respect to the enclosure 25 to have the electronic camera 21 rotate at a predetermined position around the first axial line. Therefore, there is no need to form a concave portion or form a projecting portion at a back surface of the image input unit 24 for grasping the image input unit 24 when it fits with the joggle concavity 30.

As the locking device 117 permits the rotation of the image input unit 24 from the protruding position to the housing position, and prevents the rotation of the image input unit 24 from the housing position to the protruding position, the image input unit 24 can be halted at the housing portion just by rotating the image input unit 24 from the protruding position to the housing position.

The image input unit 24 can be retained at a desired position within a predetermined range around the first axial line by the function of the retaining torque generation device 88 of the uniaxial hinge device 67. With this structure, the electronic camera 21 can be retained at a desired height (Z position) where such a camera is usually used.

The image input unit 24 can be retained with a fixed condition at plural positions within the predetermined range around the first axial line by the function of the cam device 99 of the uniaxial hinge device 67 and further, a user can feel a click for each of the positions. With this structure, the user can fix the position of the electronic camera 21 at the above plural positions (with high stability and high repeatability).

As the biaxial hinge device 101 is provided at the front edge part of the arm 69, and the biaxial hinge device 101 rotatably retains the electronic camera 21 and the camera housing unit 63 around two axes with respect to the arm 69. For example, retaining torques for respective two axes can be reduced compared with a case where the biaxial hinge device is provided at the base edge part or the middle part of the arm. Therefore, in the image input unit 24, the size of the biaxial hinge device 101 can be reduced.

By the function of the retaining torque generation device of the biaxial hinge device 101, the camera housing unit 63 can be retained at a predetermined position within a predetermined range around the second axial line with respect to the arm 69, and further the camera housing unit 63 can be retained at a desired position within a predetermined range around the third axial line with respect to the arm 69 so that the electronic camera 21 can be retained at a position facing the object.

By the function of the cam device 99 of the biaxial hinge device 101, the camera housing unit 63 can be retained at plural positions within the predetermined range around the second and the third axial lines with respect to the arm 69, and the user can feel clicks at the respective positions. With this, the user can have the electronic camera 21 face the object (with high stability and high repeatability).

The image input unit 24 having the electronic camera 21 at its one edge and extending for almost all the area of the enclosure 25 in the longitudinal direction of the enclosure 25, is connected to the enclosure 25 having about A4 size when seen in a plan view at its other edge via the uniaxial hinge device. Therefore, when placing the video conference apparatus 10 on a desk, for example, and rotating the image input unit 24 from the housing position in a range 45° to 135° with respect to the enclosure 25, the height of the electronic camera 21 can be adjusted to the height of a sitting user.

As described above, when the image input unit 24 takes the housing position, the video conference apparatus 10 has a substantially flat plate shape about A4 size, the video conference apparatus 10 has uniformity, and a user can hold the video conference apparatus 10 under his/her arm, for example, or put it in a bag or the like. As such, the video conference apparatus 10 has a good appearance and has high portability (it is very easy to carry).

As for the video conference apparatus 10, the enclosure 25, the camera housing unit 63, the cover unit 71, and the arm 69 are detachably connected. Therefore, maintenance, repair, or replacement of parts can be easily performed.

The present invention is not so limited to the specifically disclosed embodiments, and variations and modifications may be made without departing from the scope of the present invention.

Although the concavity for receiving the image input device 23 is a joggle concavity in the above embodiment, it is not necessary to be a joggle concavity. Further, the image input unit 24 may not be necessarily placed on the bottom surface defining the concavity when housed in the concavity.

Although the joggle concavity for receiving the image input device 23 is composed of the deep concavities 30a and 30b at the +X side and the −X side and the shallow concavity 30c between the deep concavities 30a and 30b, it is not so limited. It means that the joggle concavity for receiving the image input device 23 may be formed with at least one deep concavity and at least one shallow concavity, and the positional relationship between the deep concavity and the shallow concavity is not so limited as well.

Although the back surface of the image input unit 24 taking the housing position is positioned at almost the same the height as the flat part of the enclosure 25 in the above embodiment, the back surface of the image input unit 24 may be positioned lower than that of the flat part of the enclosure 25.

Although the image input unit 24 taking the housing position fits with the joggle concavity 30 in a plan view in the above embodiment, it is not necessary to be so fitted. In such a case, a clearance having a size large enough for inserting fingers may be provided between the image input unit 24 taking the housing position and the enclosure 25 so that a user can grasp the image input unit 24 without using a pop-up function. Therefore, the pop-up function is not necessary in such a case (it is not necessary to provide the helical torsion spring 83 to the uniaxial hinge device 67).

Although the cam device 99 is composed of a pair of convex cams and three pairs of concave cams each fitting with the pair of convex cams in the above embodiment, it is not so limited. A group of cams composed of three or more convex cams and plural groups of concave cams each fitting with the group of convex cams may be used. Concretely, convex cams may be formed at three or more points, not on a line, on a circumference of the second shaft member 81 at a −Y side surface of the second spacer 89b while forming concave cams composing the groups of concave cams corresponding to the convex cams of the second shaft member 81 at a +Y side surface of the second bearing unit 75c.

Although for the uniaxial hinge device 67 and the biaxial hinge device 101, the rotation range of the two hinge members rotatably connected around one axis is limited within a predetermined range, this is just an example.

For example, the range of relative rotation of the arm 69 with respect to the enclosure 25 at the uniaxial hinge device 67 may be set in the range 0° to 180°, or the camera housing unit 63 may be set as being capable of rotating 180° in both directions around the second axial line with respect to the arm 69, or the camera housing unit 63 may be set as being capable of rotating more than 45° in both directions around the third axial line with respect to the arm 69 at the biaxial hinge device 101.

Although in the above embodiment, the biaxial hinge device 101 is adopted as a connecting device for connecting the camera housing unit 63 and the arm 69, it is not so limited; for example, a uniaxial hinge device, a multi-axial hinge device two or more axes, a universal joint (a ball joint) or the like may be adopted.

Although in the above embodiment, the biaxial hinge device 101 is provided at the front edge part of the arm 69, it is not so limited and the arm may be structured by plural parts separated in the longitudinal direction and the plural parts may be relatively rotatably connected via uniaxial hinge devices, respectively.

Although one of the hinge members rotatably connected with each other is fixed to the shaft member in the above embodiment, instead, the other of the hinge members may be fixed to the shaft member or the shaft member may be rotatably supported by both of the hinge members.

Although the projected images of the first and the second axial lines on the predetermined plane (virtual plane) are perpendicular with each other in the above embodiment, it is not so limited.

Although the projected images of the second and the third axial lines on the predetermined plane (virtual plane) are perpendicular with each other in the above embodiment, it is not so limited.

Although the first and the third axial lines are in parallel or in a twisted or rotated relationship, while the projected images of the second and the third axial lines on a predetermined plane (virtual plane) are perpendicular with each other, it is not so limited. Instead, the first, the second, and the third axial lines may be set as the projected images of them on a predetermined plane (virtual plane) become perpendicular with each other.

Although the retaining torque generation device 88 is composed of the three plate springs 87 in the above embodiment, it is not so limited, and the retaining torque generation device may be composed of a one, two, four or more plate springs 87.

Although the retaining torque generation device 88 is composed of group of plate springs 88 in the above embodiment, the retaining torque generation device 88 may be composed of a resilience member such as a coil spring or the like.

The locking device may be a type other than that explained in the above embodiment. For example, the locking device may be composed of just a slide type fastener or the like for preventing the image input unit 24 taking the housing position protruding from the joggle concavity 30.

The number, the kind, and the placement of the operation buttons embedded in the flat part of the enclosure 25 explained in the above embodiment are just an example and are not so limited as described.

Although the pushing buttons and the cursor are exemplified for the operation units in the above embodiment, slide type members may be used.

Although the enclosure 25 is formed to have a rectangular shape when seen in a plan view in the above embodiment, it is not so limited and may be formed in a polygon shape other than the rectangular shape or an elliptical shape when seen in a plan view.

Although the joggle concavity 30 is formed in a rectangular shape when seen in a plan view in the above embodiment, it is not so limited and may be formed in a polygon shape other than the rectangular shape or an elliptical shape when seen in a plan view. In such a case, the back surface of the image input unit 24 is formed to fit with the plane shape of the joggle concavity 30, and the image input unit 24 and the joggle concavity 30 are fit with each other to form the upper surface of the enclosure 25.

Although the video conference apparatus 10 capable of performing two-way communication (send and receive) of image and voice data is exemplified as the communication apparatus in the above embodiment, the communication apparatus may have at least one of the functions of, sending image data, sending image data and voice data, sending image data and receiving voice data, sending and receiving image data and sending voice data, and sending image data and sending and receiving voice data.

In the communication apparatus, the locking mechanism may permit a rotation of the image input unit taking the protruding position toward the housing position.

The communication apparatus may further include an operation unit that operates the unlock mechanism formed at the one side surface of the enclosure with an exposed condition.

In the communication apparatus, the locking mechanism and the unlock mechanism may be formed to have a common part with each other.

In the communication apparatus, the pop-up device may include a resilient member that pushes the first hinge member and the second hinge member toward the opening direction.

In the communication apparatus, the uniaxial hinge device may include a stopper device that retains the first part and the second part in a fixed condition at least at one relative position within a predetermined range around the second axial line.

In the communication apparatus, the connecting device may include a stopper device that retains the first part and the second part in a fixed condition at least at one relative position within a predetermined range around the third axial line.

As described above, the communication apparatus of the embodiment is capable of capturing an object within a photographing field and is suitable for carrying.

What is claimed is:

1. A camera comprising:
   a camera section including a camera that inputs an image of an object;
   an arm;
   a two axis hinge directly connecting the arm and the camera section, a first axis of the two axis hinge being parallel to a first axial line, and a second axis of the two axis hinge being parallel to a second axial line which is perpendicular to the first axial line, the two axis hinge including a mount for the camera section, a mount for the arm, and a combination of a first rotating connection and second rotating connection that is perpendicular to the first rotating connection, the first rotating connection connected to the second rotating connection, the combination connected between the mount for the camera section and the mount for the arm,
wherein:
the second rotating connection comprises two rotating connections; and
the two rotating connections are each perpendicular to the first rotating connection.

2. The camera according to claim 1, wherein the two axis hinge is a single device.

3. The camera according to claim 1, wherein:
the arm has a rectangular shape with a width parallel to the first axial line, a length parallel to the second axial line, and a thickness perpendicular to the first and second axial lines; and
a thickness of the camera section is in a same direction as the thickness of the arm, and a thickness of the camera section corresponds to the thickness of the arm at a point of connection of the camera section to the arm, and the thickness of the camera section smoothly increases as a distance from the connection of the camera section to the arm increases.

4. The camera according to claim 1, further comprising a C-shaped section connected between the first rotating connection which is a single rotating connection and the two rotating connections, a center of a length of the C-shaped section connected to the single rotating connection and ends of the C-shaped section connection connected to a corresponding one of the two rotating connections.

5. The camera according to claim 1, further comprising an enclosure including a recess at one side thereof, wherein the camera section and arm fit within the recess.

6. The camera according to claim 1, further comprising an enclosure including a recess at one side thereof, wherein one surface of the camera section is at least on a part of the enclosure defining a bottom surface of the recess, when the camera section and the arm are in a storage position.

7. The camera according to claim 1, further comprising an enclosure that includes therein a transmitter for sending image data from the camera.

8. The camera according to claim 1, further comprising a uniaxial hinge directly connecting the arm to an enclosure and rotatable around a line that extends substantially perpendicular to a length of a recess, the uniaxial hinge connected to the enclosure.

9. The camera according to claim 8, further comprising a locking device that includes a locking mechanism preventing a rotation of the arm from a storage position.

10. The camera according to claim 9, wherein the locking device further includes an unlock mechanism that unlocks the arm and permits the arm to rotate.

11. The camera according to claim 10, further comprising a pop-up device that moves at least a portion of the arm and camera section when the unlock mechanism unlocks the arm.

12. The camera according to claim 8, wherein the uniaxial hinge is capable of retaining the arm at a desired position within a predetermined range around the first axial line.

13. The camera according to claim 12, wherein the predetermined range is a rotation angle of the arm around the first axial line from a storage position between 45° and 135°.

14. The camera according to claim 1, further comprising:
a transmitter that sends the image over a network; and
a microphone to input voice audio,
wherein the transmitter sends voice data of the voice audio input by the microphone via the network when sending the image.

15. The camera according to claim 14, further comprising:
a receiver that receives image data and voice data sent via the network;
an image data sending unit that sends the image data received by the receiver to an image display device; and
a speaker that outputs the voice audio received by the receiver, wherein two-way communication of the image data and the voice data via the network is performed.

16. The camera according to claim 1, further comprising an enclosure including a recess at one side thereof, wherein:
a length of the recess substantially corresponds to a length of the enclosure, and a width of the recess being shorter than the length of the recess; and
the camera section and the arm together have an elongated shape having a length almost the same as the length of the recess.

17. The camera according to claim 1, further comprising an enclosure including a recess at one side thereof, wherein:
when the arm is in a storage position within the recess, a plane of a back surface of the camera section is parallel to a plane of a back surface of the arm; and
the camera is at a front surface of the camera section.

18. The camera according to claim 17, wherein when the arm is in the storage position within the recess, the plane of the back surface of the camera section, the plane of the back surface of the arm, and a line along a length of the enclosure at a highest part of the enclosure are parallel to each other, the planes each including the line along the length of the enclosure.

19. The camera according to claim 16, wherein the first axis of the two-axis hinge is parallel to the first axial line only when the second axis of the two-axis hinge is in an orientation corresponding to a storage position.

* * * * *